United States Patent
Gerber

(10) Patent No.: US 7,665,398 B2
(45) Date of Patent: Feb. 23, 2010

(54) SOFT-FROZEN CONFECTION BLENDING AND DISPENSING FREEZER

(75) Inventor: Ernest C. Gerber, Danville, IN (US)

(73) Assignee: Flavor Burst Co., L.L.P., Danville, IN (US)

( * ) Notice: Subject to any disclaimer, the term of this patent is extended or adjusted under 35 U.S.C. 154(b) by 901 days.

(21) Appl. No.: 11/354,752

(22) Filed: Feb. 15, 2006

(65) Prior Publication Data

US 2007/0110872 A1     May 17, 2007

Related U.S. Application Data

(63) Continuation-in-part of application No. 11/181,604, filed on Jul. 14, 2005, now Pat. No. 7,621,669, which is a continuation-in-part of application No. 10/796,742, filed on Mar. 9, 2004, now Pat. No. 7,178,976.

(51) Int. Cl.
*A23G 9/00* (2006.01)

(52) U.S. Cl. .............................. 99/455; 99/466; 62/337; 62/342; 366/156.1

(58) Field of Classification Search .................. 62/331, 62/337, 342; 99/455, 460, 466; 366/156.1, 366/156.2

See application file for complete search history.

(56) References Cited

U.S. PATENT DOCUMENTS

| | | | |
|---|---|---|---|
| 1,449,623 A | 3/1923 | Pfouts | |
| 2,032,970 A | 3/1936 | Bendfelt | |
| 2,190,226 A | 2/1940 | Alexander | |
| 2,239,165 A | 4/1941 | Adams | |
| 2,576,842 A | 11/1951 | Lehner | |

(Continued)

FOREIGN PATENT DOCUMENTS

| DE | 3521612 A1 | 11/1986 |
|---|---|---|
| GB | 1465312 | 2/1977 |

OTHER PUBLICATIONS

PCT International Search Report, International Application No. PCT/US2007/61772, Applicant: Flavor Burst Co., L.L.P., Search Report mailed Sep. 23, 2008, 3 pages.
Supplementary European Search Report, Application No. EP 05 72 4774, PCT/US2005007295, Applicant: Flavor Burst Co., Search Report mailed Oct, 27, 2008, 3 pages.

*Primary Examiner*—Tony G Soohoo
(74) *Attorney, Agent, or Firm*—Woodard, Emhardt, Moriarty, McNett & Henry LLP

(57) ABSTRACT

A soft-serve confection freezer incorporates a set of modules in a circular array and separately replaceable in a magazine. Each module supports a container storing a dry food ingredient in solid particulate form, and has a motor driven product impeller for controlled discharge of particulates from the container to a blender assembly. The blender assembly has a housing and screw-type auger of cooperating configurations and which cooperate with a central passageway for frozen confection flowing from the freezer, to blend particulates from one or more containers into the confection and discharge into a customer's cup for immediate consumption. A further version incorporates a magazine for injection and blending of one or more flavored liquids into the frozen confection. Control panel selection of ingredients and flavors and dispensing by the operator according to the customer's order, or selection and dispensing by the customer himself/herself, is provided. Components are arranged to facilitate cleaning.

45 Claims, 29 Drawing Sheets

U.S. PATENT DOCUMENTS

| | | | |
|---|---|---|---|
| 2,592,709 A | 4/1952 | Kinnaird | |
| 2,995,107 A | 8/1961 | Archer | |
| 3,001,770 A | 9/1961 | Mueller | |
| 3,014,437 A | 12/1961 | Dutchess | |
| 3,132,847 A | 5/1964 | Mercuiali | |
| 3,167,031 A | 1/1965 | Taylor | |
| 3,291,076 A | 12/1966 | Flanigan et al. | |
| 3,347,287 A | 10/1967 | Geber | |
| 3,477,393 A | 11/1969 | Bell et al. | |
| 3,803,870 A * | 4/1974 | Conz | 62/342 |
| 3,918,862 A | 11/1975 | Bellew | |
| 3,920,223 A | 11/1975 | Krueger | |
| 4,010,284 A | 3/1977 | Bellew | |
| 4,100,304 A | 7/1978 | Getman | |
| 4,188,768 A | 2/1980 | Getman | |
| 4,189,289 A | 2/1980 | Getman | |
| 4,201,558 A | 5/1980 | Schwitters et al. | |
| 4,203,461 A | 5/1980 | Schwitters | |
| D256,124 S | 7/1980 | Adamson et al. | |
| 4,275,567 A | 6/1981 | Schwitters | |
| 4,364,666 A | 12/1982 | Keyes | |
| 4,390,760 A | 6/1983 | Schwitters | |
| 4,393,659 A | 7/1983 | Keyes et al. | |
| 4,397,880 A | 8/1983 | Crothers | |
| 4,397,881 A | 8/1983 | Crothers | |
| 4,447,458 A | 5/1984 | Roth et al. | |
| 4,448,114 A | 5/1984 | Mayer | |
| 4,544,085 A | 10/1985 | Frazer | |
| 4,574,593 A | 3/1986 | Nelson | |
| 4,580,905 A | 4/1986 | Schwitters et al. | |
| 4,625,525 A | 12/1986 | Bradbury et al. | |
| 4,643,335 A | 2/1987 | Carnisio | |
| 4,643,905 A | 2/1987 | Getman | |
| 4,668,561 A | 5/1987 | Ney | |
| 4,732,013 A | 3/1988 | Beck | |
| 4,793,520 A | 12/1988 | Gerber | |
| 4,861,255 A | 8/1989 | Ney | |
| 4,878,760 A | 11/1989 | Newton et al. | |
| 4,881,663 A | 11/1989 | Seymour | |
| 4,923,093 A | 5/1990 | Gerber | |
| 5,256,426 A | 10/1993 | Tomioka et al. | |
| 5,271,572 A | 12/1993 | Grandi | |
| 5,378,483 A | 1/1995 | Fazio et al. | |
| 5,690,283 A | 11/1997 | Sandolo | |
| 5,743,639 A | 4/1998 | Puerner et al. | |
| 5,823,392 A | 10/1998 | Madico | |
| 6,145,701 A | 11/2000 | Van Der Merwe et al. | |
| 6,319,532 B1 | 11/2001 | Pineault | |
| 6,514,555 B1 | 2/2003 | Fayard et al. | |
| 6,689,410 B2 | 2/2004 | Gerber | |
| 7,178,976 B2 * | 2/2007 | Gerber | 366/177.1 |
| 7,621,669 B1 * | 11/2009 | Gerber | 366/177.1 |
| 2003/0000240 A1 | 1/2003 | Pahl | |
| 2003/0085237 A1 | 5/2003 | Kateman et al. | |
| 2003/0145734 A1 | 8/2003 | Ervin | |
| 2005/0175767 A1 | 8/2005 | Gerber | |
| 2005/0201196 A1 | 9/2005 | Gerber | |
| 2005/0263536 A1 | 12/2005 | Selfridge et al. | |
| 2006/0013941 A1 | 1/2006 | Miller et al. | |

\* cited by examiner

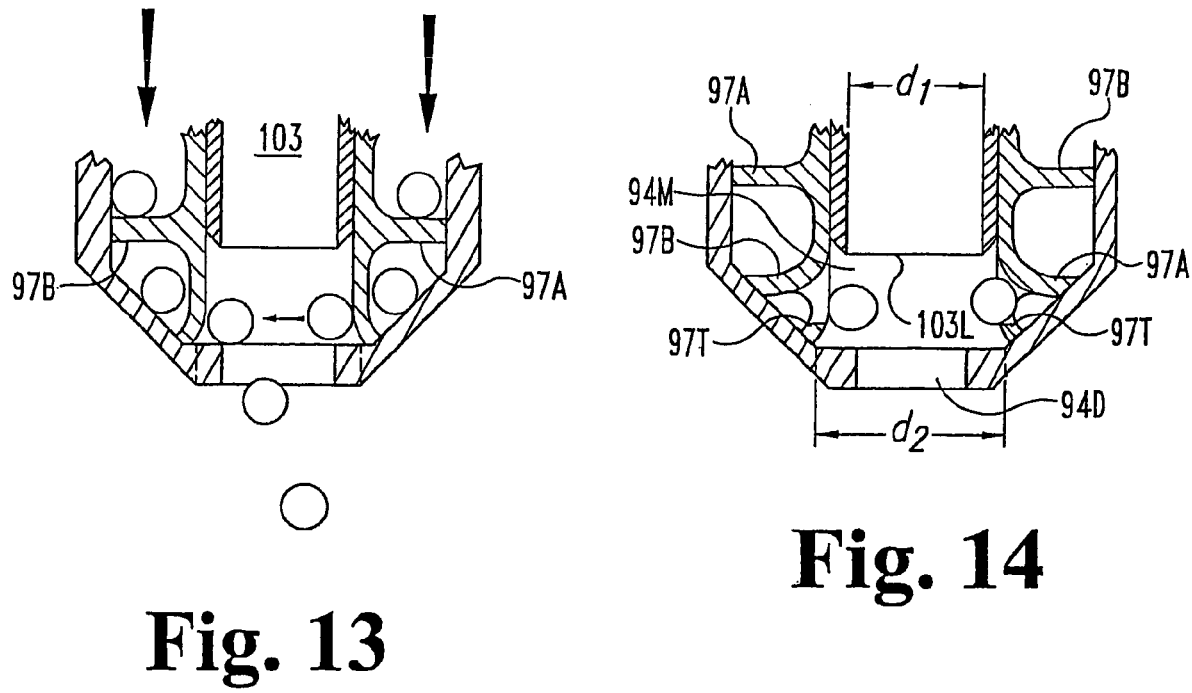
Fig. 13
Fig. 14
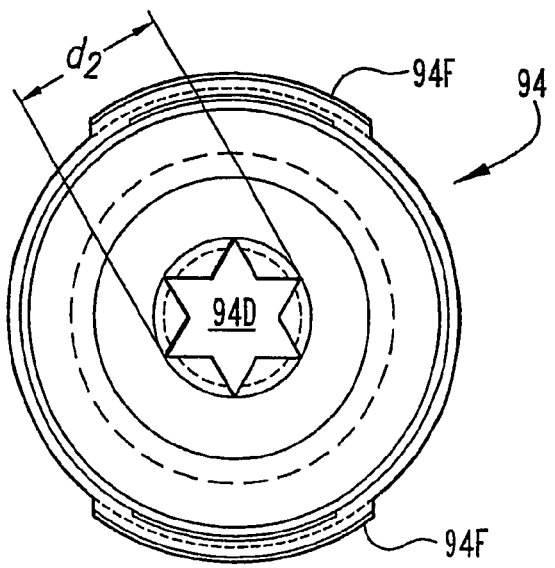
Fig. 15

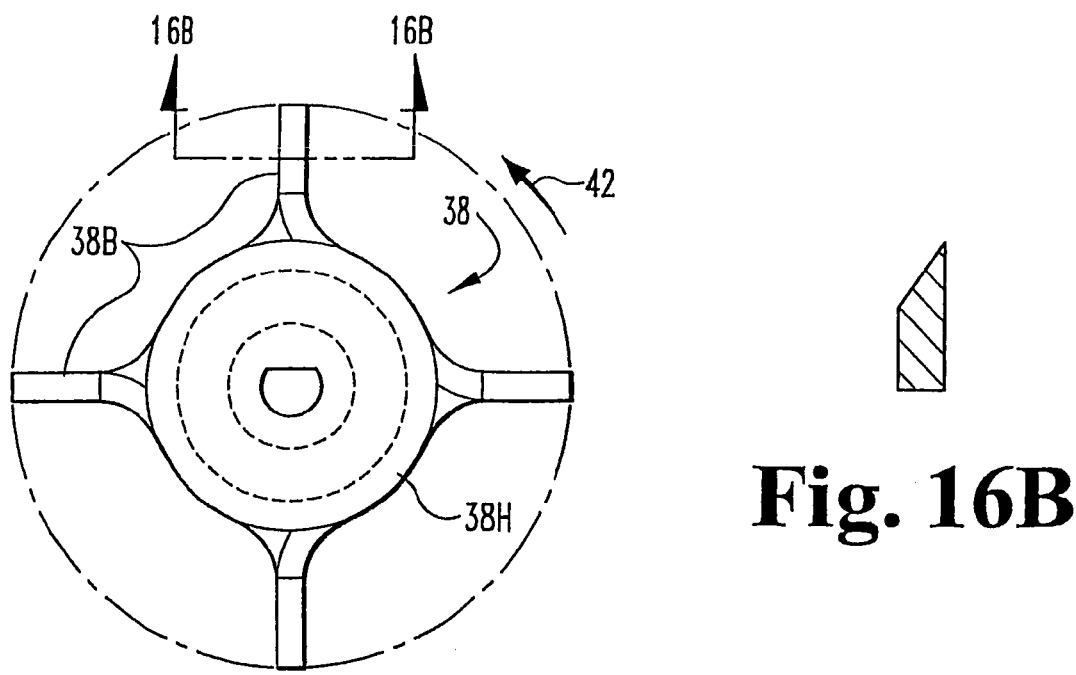
Fig. 16A
Fig. 16B
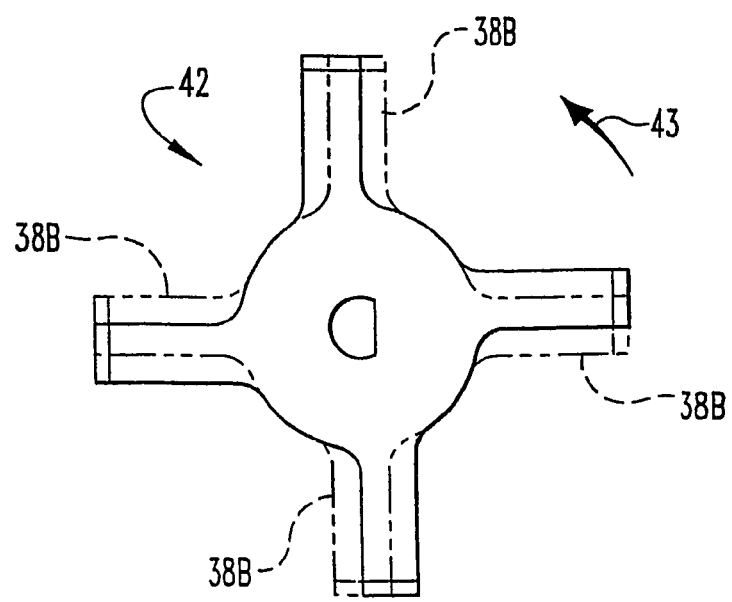
Fig. 17

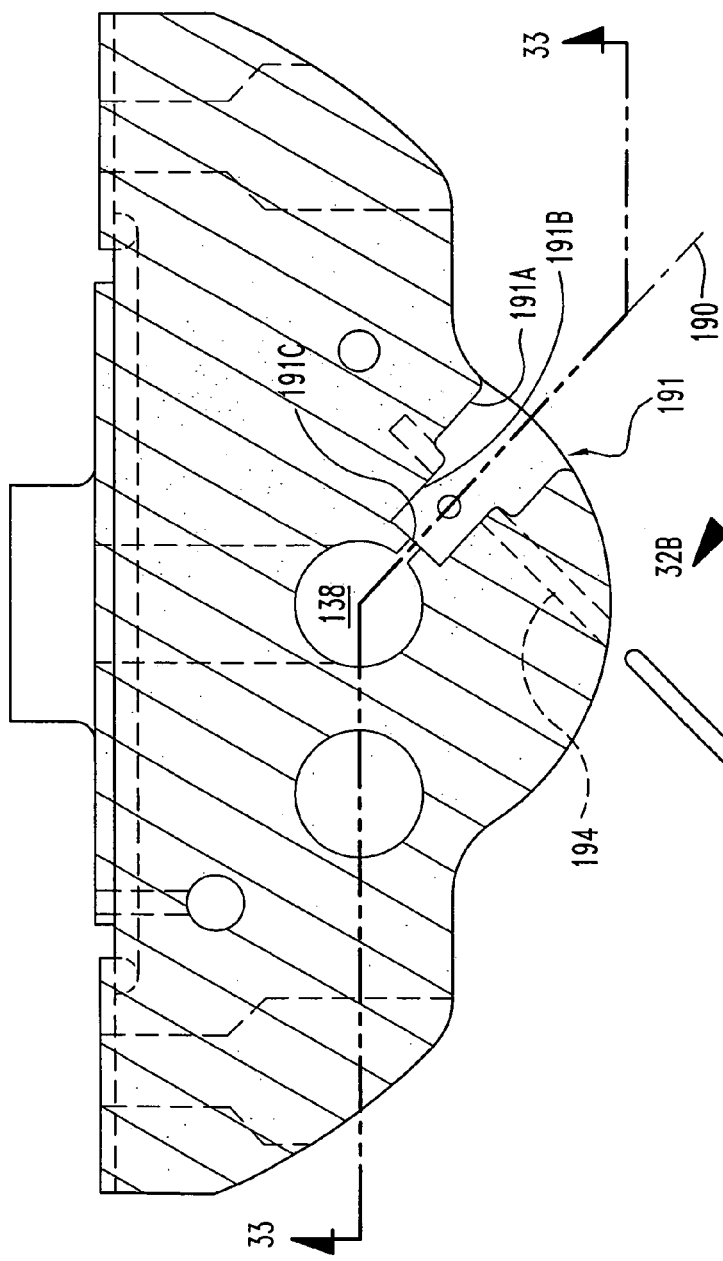
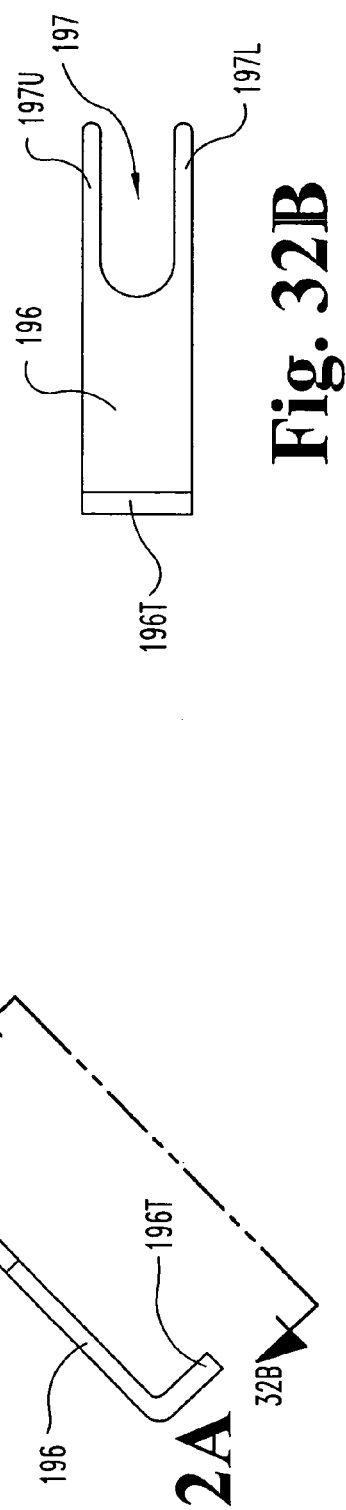
Fig. 32
Fig. 32A
Fig. 32B

SOFT-FROZEN CONFECTION BLENDING AND DISPENSING FREEZER

This application is a continuation-in-part of patent application Ser. No. 11/181,604 filed Jul. 14, 2005, now U.S. Pat. No. 7,621,669. Priority is claimed based on said application. That application is a continuation-in-part of patent application Ser. No. 10/796,742 filed Mar. 9, 2004, now U.S. Pat. No. 7,178,976. The disclosures of said two applications are incorporated herein directly or by reference.

BACKGROUND OF THE INVENTION

This application relates generally to apparatus for dispensing flavored, flow-able frozen foods to a customer for soft-serve ice cream, ice milk, ices, smoothies, slushes, shakes or the like.

My U.S. Pat. No. 4,793,520 issued Dec. 27, 1988 and certain patents cited therein, disclose various approaches to mixing several different flavoring liquids to a base mix of ice cream. U.S. Pat. No. 3,001,770 issued to Mueller on Sep. 26, 1961 shows a machine for mixing different flavoring liquids with ice cream and has a device for injecting nuts into the mixture. To the best of my knowledge, there is no soft-serve freezer machine available and which incorporates in its construction, features enabling a customer of a business establishment to dispense to himself or herself, a soft-serve frozen confection incorporating a combination of solid and liquid flavoring ingredients personally selected by the customer. The present invention is addressed to this subject

SUMMARY

Described briefly, one embodiment of the invention comprises method and apparatus readily adaptable to use with conventional, commercially available freezer dispensers for semi-frozen foods, and enabling customer selection and blending various different food ingredients in solid form into a food product (hereinafter referred to as semi-frozen base) drawn from the freezer dispenser at a temperature below 0 degrees Celsius, and dispensing into a customer's container on demand, selected blends of food ingredient solids in the semi-frozen base as a soft-serve confection.

Another embodiment of the invention enables the additional feature of selection and blending various liquid flavorings and colorings, into the semi-frozen base.

Still another embodiment of the invention incorporates directly into soft-serve freezer apparatus, features enabling a customer to select one or more various food condiment ingredients, and one or more flavoring and/or coloring liquids, and blend them into a semi-frozen base while dispensing the blended product from the freezer apparatus into the customer's serving cup.

BRIEF DESCRIPTION OF THE DRAWINGS

FIG. 13 is a fragmentary longitudinal sectional view of part of the blending auger and blender hopper taken at line 13-13 in FIG. 10 and showing the shape of the lower end portion of the auger core at a position about 60 degrees of rotational index about axis 93 from the FIG. 11 position.

FIG. 14 is a view similar to FIG. 13 but taken at line 14-14 in FIG. 10 and showing the shape of the auger core and flights at a slightly further rotational index position where portions of the core are cut-out to admit ingredient solids into a downward flowing frozen confection base product.

FIG. 15 is a top view of the blender hopper, showing one possible outlet shape, and showing mounting flanges.

FIG. 16A is a top plan view of a transfer impeller.

FIG. 16B is a section taken at line B-B in FIG. 16A and viewed in the direction of the arrows.

FIG. 17 is a top plan view of an agitator.

FIG. 32 is a horizontal section through the freezer door taken at line 32-32 in FIG. 31 and viewed in the direction of the arrows.

FIG. 32A is a top view of a syrup injector retainer clip.

FIG. 32B is a side view of the syrup injector retainer clip.

DESCRIPTION OF THE ILLUSTRATED EMBODIMENTS

Figure 1:
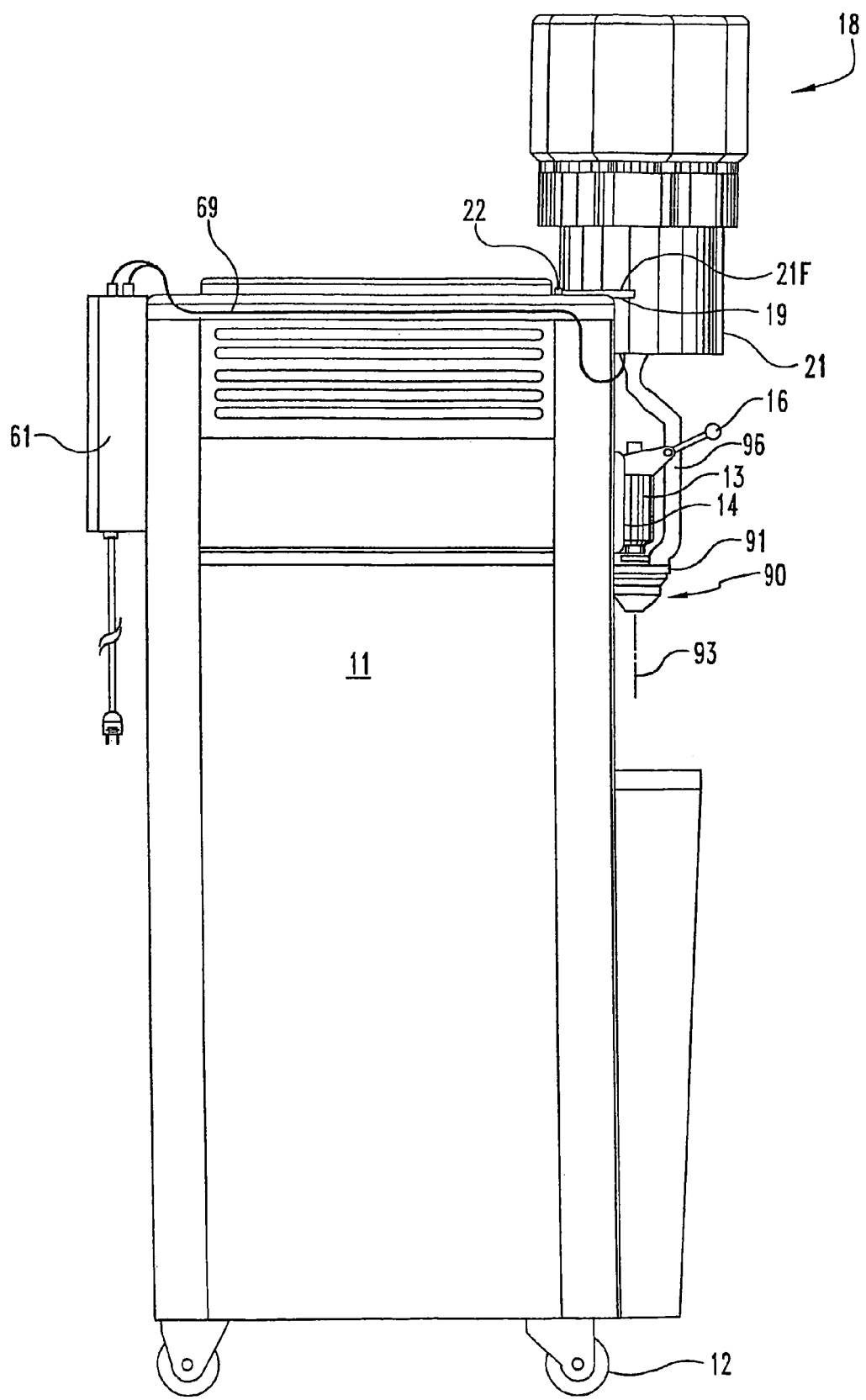
FIG. 1 is a side elevation view of a conventional soft-serve ice cream freezer machine with a blender dispenser mounted to it according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1-19 of the drawings in detail, a soft-serve ice cream freezer assembly 11 is supported on wheels 12 and has a discharge spigot 13 on a front plate 14 removable from the freezer, usually by loosening four knobs. The spigot has an operating handle 16. Upon pulling the handle down, a frozen, usually unflavored, base product is discharged from the freezer through the spigot in the direction of arrow 17. Examples of such soft-serve freezers are Taylor Model 754, 338, 339, 741, H84, 8754, C706, C707, and C708. Other brands of freezers may be used also. Some older Taylor models and other brands are identified in my above-mentioned patent.

Apparatus incorporating an embodiment of the present invention includes an ingredient storage assembly, a blender assembly, means for transfer of selected ingredients from the storage assembly to the blender assembly, and related mounting, selection and control devices.

The ingredient storage and transfer assembly 18 is attached to the top of the freezer by use of a mounting plate 19 (FIG. 1). This plate uses a double-faced bonding tape that bonds the plate to the top of the freezer cabinet. Other or additional fasteners may be used, if desired. Mounting base 21 is a molded plastic part FIG. 5 having a flange 21F with slots 21S in its rear-edge receiving upstanding studs (not shown) on the mounting plate 19. It is attached to the mounting plate by use of two clamping knobs 22 screwed onto the studs and securing the mounting base to the mounting plate.

The upper end of the mounting base 21 supports and centers the top flange of funnel 23. An upper support plate 24 (FIGS. 2A and 6) rests on the top flange of the funnel. This plate supports eight removable modules 25 in a circular array about an axis 26 through the center of the plate 24. A lower support plate 27 (FIGS. 2A and 7) rests on the ledge 21L of the mounting base. It is connected to upper support plate 24 by an array of eight circularly spaced vertical support plates 28, preferably made of molded plastic and having bosses 28B at upper and lower edges receiving screws through the holes 24H and 27H in the upper and lower support plates 24 and 27, respectively. This assembly of plates 24, 27 and 28 provides a receiver frame in the ingredient storage assembly 18 for the eight removable dispensing modules 25 mentioned above. These modules have motor housings 29 supporting container bases 31 receiving eight ingredient containers 32. Each of these containers contains a different type of solids capable of being blended into the base product flowing from the freezer to the spigot outlet when the handle 16 is pulled down. A "solid" for such purposes may be defined as a discrete tangible edible item appearing dry to touch at 72° F., elastic or inelastic, porous or non-porous, hollow or not hollow, and having a maximum overall dimension in any direction less than or equal to about 0.300 inches. Some types of solids include, but are not limited to, nuts of different types and flavors, raisins, M & M's, chocolate chips, different flavors of fruit bits, different flavors of candy bits and sprinkles, to name a few. Others may be used too. Also, if it is found that customers have a greater preference for one type than some of the other types, more than one of the containers can be filled with the preferred type.

Figure 2A:
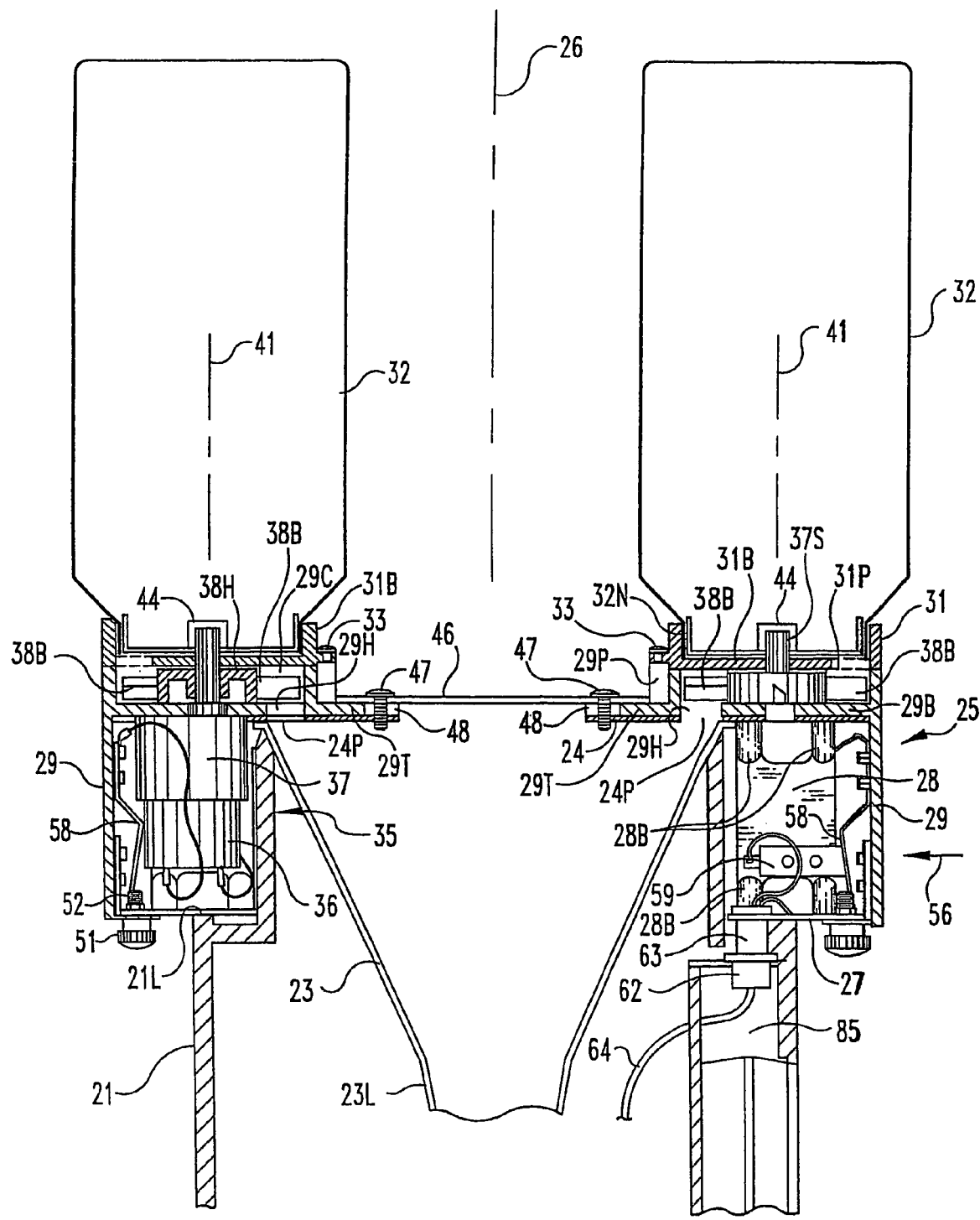
FIG. 2A is an enlarged front view in section of an ingredient storage and transfer assembly.
Figure 8:
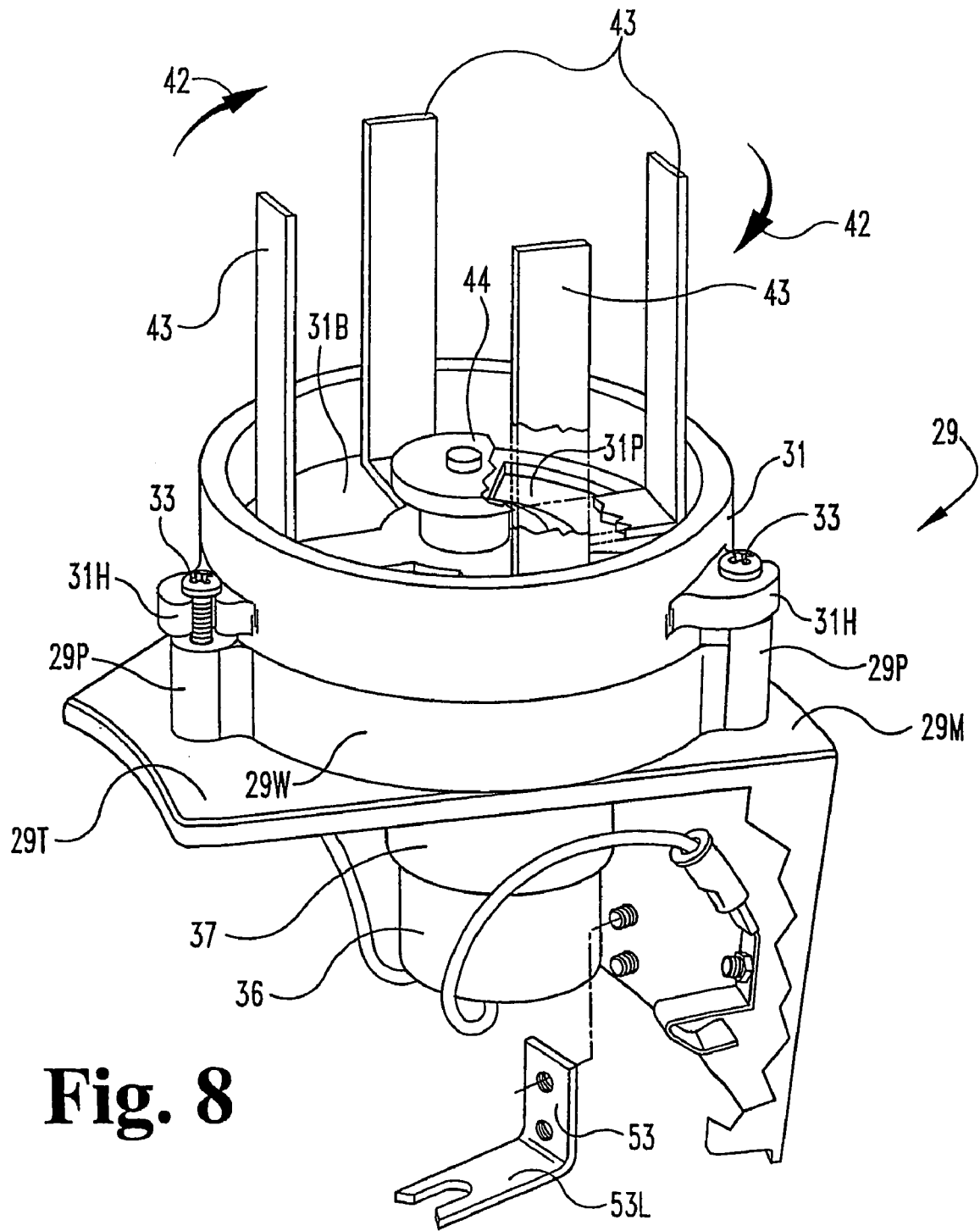
FIG. 8 is a perspective view of a dispensing module.
Figure 9:
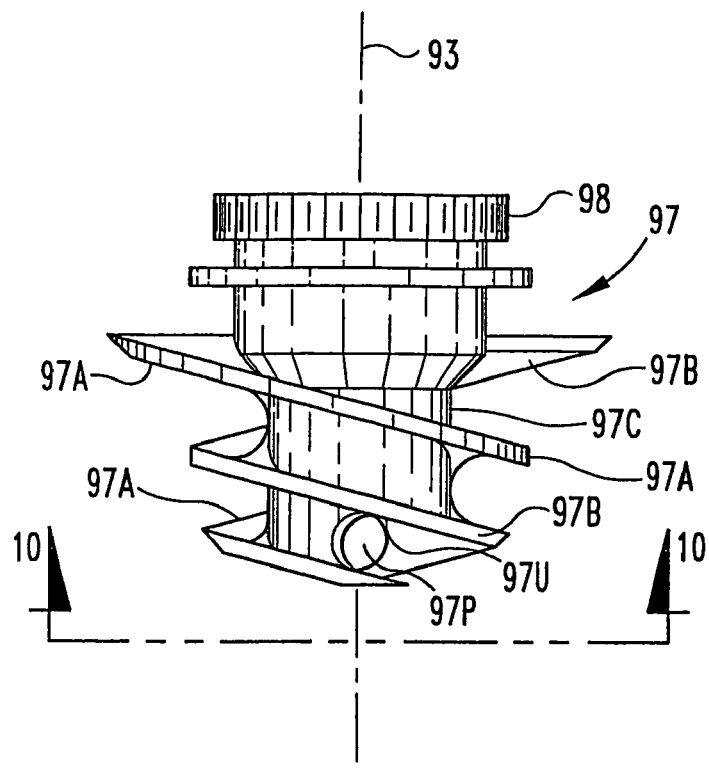
FIG. 9 is an enlarged elevation view of a blending auger.

All of the eight modules can be identical, so a description of one will suffice. Referring to FIG. 2A, note that the module shown to the left of the axis 26 shows motor housing 29 with a gear motor assembly 34 inside, but a gear motor assembly for the module to the right side of axis 26 is omitted from the drawing to show other details of the module. Referring specifically to FIGS. 2A and 8, each motor housing 29, usefully made of molded plastic, has a mounting portion 29M which is shaped like a sector of a circle, and is received on upper support plate 24. The housing has a cylindrical wall 29W projecting up from portion 29M and forming an upwardly opening cylindrical chamber 29C (FIG. 2A). The bottom 29B of chamber 29C is the top of an area of mounting portion 29M and has a hole 29H which is in registry with one of the eight holes 24P in the support plate 24.

Container base 31 (also usefully made of molded plastic) sits atop the motor housing 29 and has three hooks received on posts 29P of housing 29 and engaging and hooked to screws 33 in posts 29P by a counterclockwise twist of the base 31 relative to the housing 29. The bottom 31B of the container base 31 has a hole 31P (FIG. 8) which is in a sector diametrically opposite (relative to axis 41) the sector in which hole 24P in the upper support plate 24, and hole 29H in the housing 29 are located, the latter holes 24P and 29H being open to the funnel 23.

The gear motor assembly 34 with motor portion 36 and reduction gear portion 37 is fastened by screws (not shown) to the bottom of the mounting portion 29M of the motor housing. The output drive shaft 37S of the gear portion projects up through a small hole in the center of chamber bottom 29B, and through the hub 38H of ingredient transfer impeller 38 (FIGS. 15A, 15B) which has four blades 38B circularly spaced about the shaft axis 41. The blades are about half the height of the chamber 29C. The upper portion of the leading (when the impeller is driven in the direction of arrow 42) edge of each blade is sloped up toward the trailing edge. This feature helps avoid jamming of certain types of ingredients between the impeller blades and the roof of the chamber 29C. The shaft 37S also projects through a small hole in the center of bottom 31B of the container base 31 and through the hub of the four-arm agitator 43 (FIG. 16). The shaft receiving holes in the center of the transfer impeller hub and in the center of the agitator hub have a flat which matches the flat on drive shaft 37S to drive the impeller and agitator when the motor is energized. A rubber cap 44 holds the agitator on the shaft.

As shown in FIG. 16A, the agitator arms are slightly offset ahead of radii from the rotational axis 41 of the agitator. Accordingly the leading edges of the agitator arms are about one-half arm's width ahead of the leading edge of the transfer impeller blades. This is shown in FIG. 17 where the impeller arms are shown in dotted lines. This feature assists in the transfer of ingredients from a container 32 to chamber 29C.

The container base 31 provides an upwardly opening cylindrical chamber which friction fits and receives the neck portion 32N at the open end of container 32. The fit is close enough that there is no leakage of the dry ingredients up and out of the base 31 around the container neck.

Each module is retained in place in at least two ways. The first way involves a motor housing retainer plate 46 fastened to upper support plate 24 by four screws 47 equally spaced circularly, about axis 26, with spacers 48 between plates 24 and 46. The spacing thereby provided admits the tongue 29T (FIG. 8) of the motor housing and prevents it from tipping up.

A second way the module is retained is by a clamping knob 51 fixed to a screw 52 which is freely receivable into a slot in leg 53L of bracket 53 which is fixed to the inside wall of motor housing 29. The slot is forked with its open end facing toward axis 26. The screw is threaded into lower support plate 27 so that, when a module is properly inserted as in the direction of arrow 56 (FIG. 2A) toward axis 26, the screw is received in the fork slot and the knob 51 can be turned to clamp the module to the lower support plate 27. So it is clamped to the receiver frame of plates 24, 27, 28.

Each of the modules has two electrical contactors 58 on the inner face of the motor housing and which, when the module is installed, engage contactors such as 59 mounted on the vertical supports 28, to enable electric power feed from an electronic controller 61 (FIG. 1) to the motors 36. An eight pair connector socket 62 fixed in the mounting base receives mating plug 63 fixed in the lower support plate 27. The two contactors 59 from all of the eight stations are wired to plug 63. A pair of leads from the socket at 62 extend in wire 64 to the plug 66 received in socket 67 at the end of wiring 68 which enters the wiring harness 69, which extends to the controller 61. The wiring harness also contains cables 71, 72 and 73, each of which has an electrical socket at the end for connection to some component of the apparatus. Cable 71 connects to a plug 74 for communication with the data entry panel 76. Cable 72 connects to a plug 77 for cable 78 to an auger drive motor 79. The plug on cable 73 is connected to socket 81 for the dispenser start switch 82. This arrangement makes it easy to disconnect the electrical components by simply removing the mounting base cover panel 83 from the bottom of the mounting base and unplugging the electrical connectors.

The data entry panel (DEP) 76 is received in a downwardly opening slot 84 (FIGS. 2A, 2B and 5) by sliding it upward into the slot 84 and into chamber 85 in the mounting base. It is retained in place by the mounting base cover panel 83 which is screwed into the bottom of the mounting base. The face of the keypad has legends for programming the equipment, as will be described hereinafter. The output from the keypad is fed through connector 74 and cable 71 in harness 69 to the controller 61.

A blender assembly 90 has a housing 91 (FIG. 2B and FIG. 18 bottom view) mounted to and supported on the freezer by a mounting bracket (not shown) to secure the blender assembly to the freezer. The blender assembly is coupled to spigot 13 by adapter 92 having upper end 92U received on and sealed by an o-ring to the spout. The adapter has flange 92F receiving a collar 92C connected to the upper end portion 90U of the blender assembly by a split ring retainer 92R in a circular groove in the upper end portion of the blender assembly. The adapter is sealed by an o-ring to the inside surface of the upper end portion 90U of the blender assembly. Varieties of mounting brackets and adapters are available to accommodate different freezer configurations. Since a freezer typically dispenses in some axial direction, it can be convenient but is not necessary to adopt such axis in implementing the present invention. In the present example, an axis 93 is established by the housing 91 for the blender assembly. A blender hopper 94 is mounted to housing 91.

Figure 18:
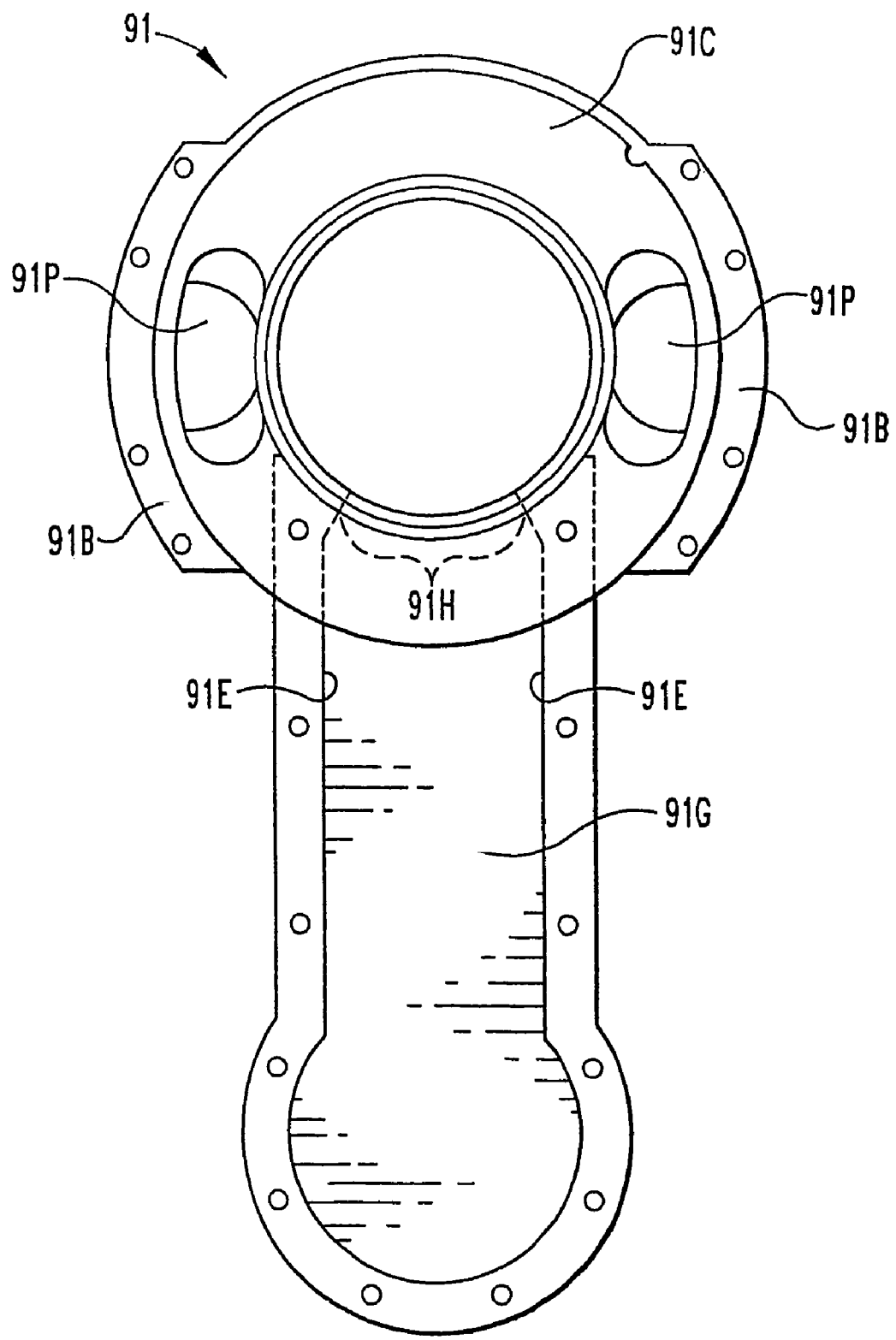
FIG. 18 is a bottom view of a blender housing, with bottom coverings removed.
Figure 19:
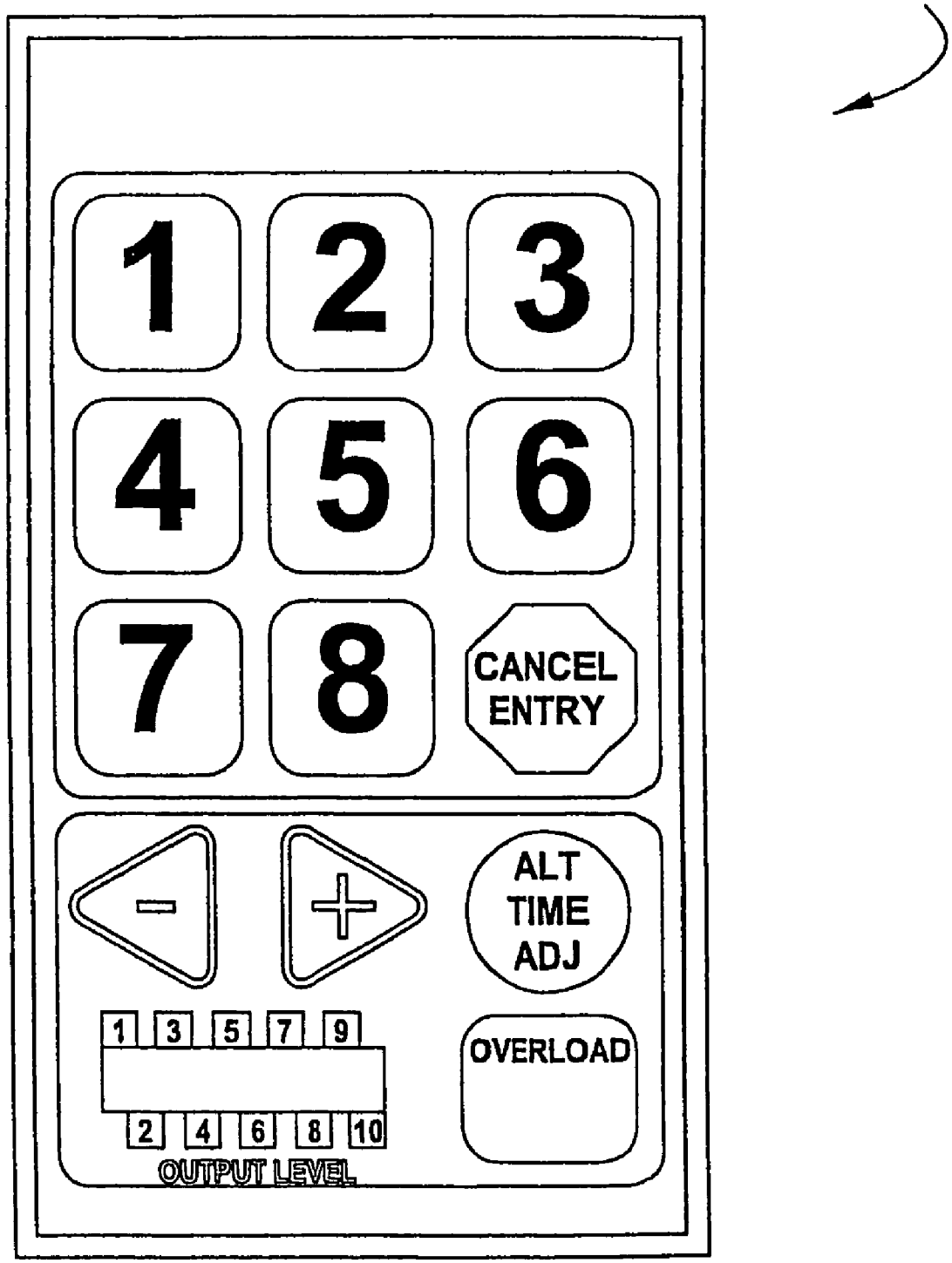
FIG. 19 is a front view of a data entry panel.
Figure 20:
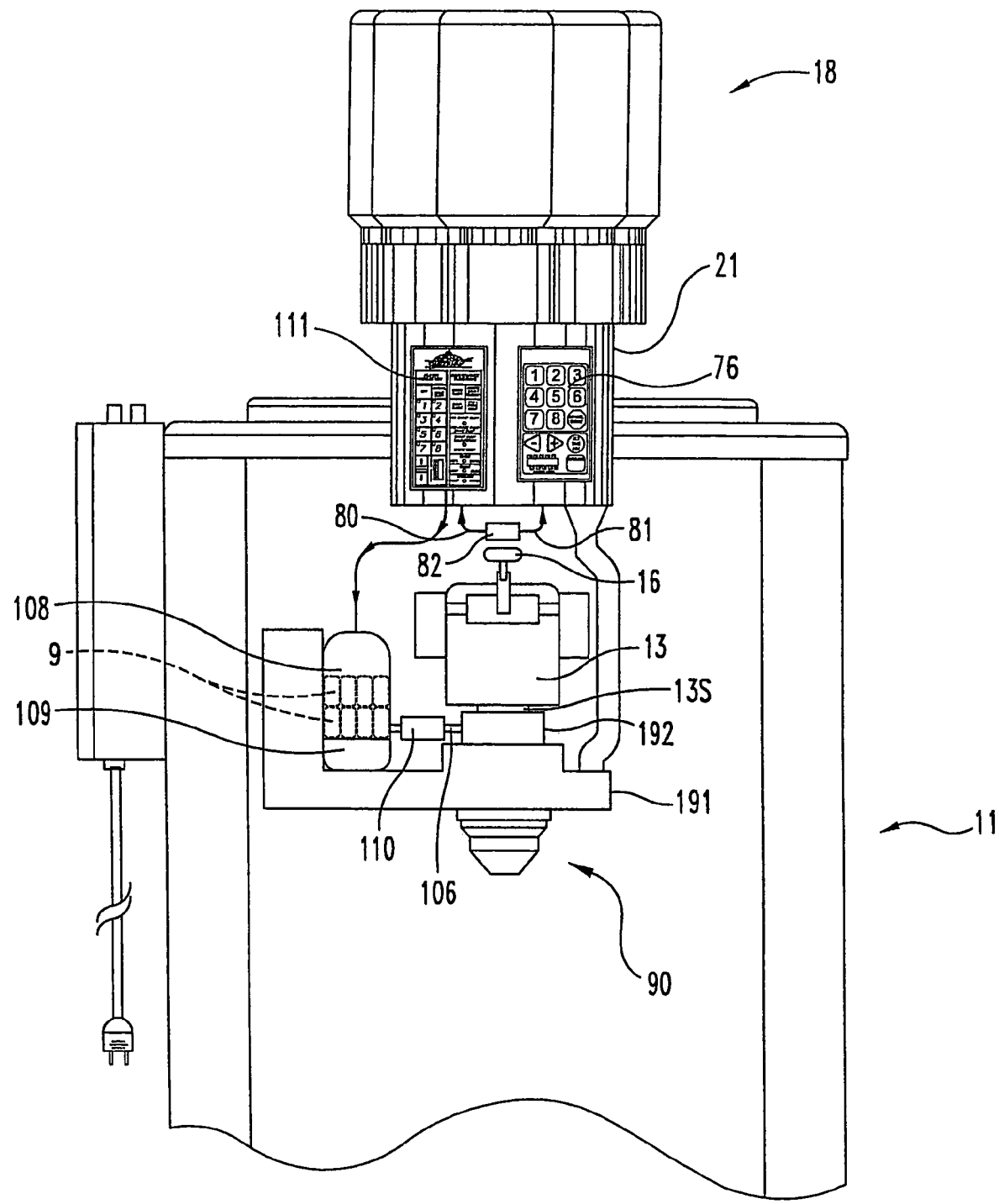
FIG. 20 is an elevation view in schematic form of a second embodiment of the present invention.

Since the blender hopper is to receive solid ingredients from selected ones of containers 32, the housing 91 has two upwardly-opening circular ports 91P to which tubing 96 can be connected to deliver ingredients from hopper 23 through the housing 91 to the blender hopper 94. In FIG. 18, these ports are shown, but need not be, located on diametrically opposite sides of the cylindrical wall 91W of the housing and which is centered on axis 93. It is adequate to use only one of these ports for connection to the tubing, but two of them are provided to facilitate alternate entry locations for adaptation to freezers of different designs.

Figure 2B:
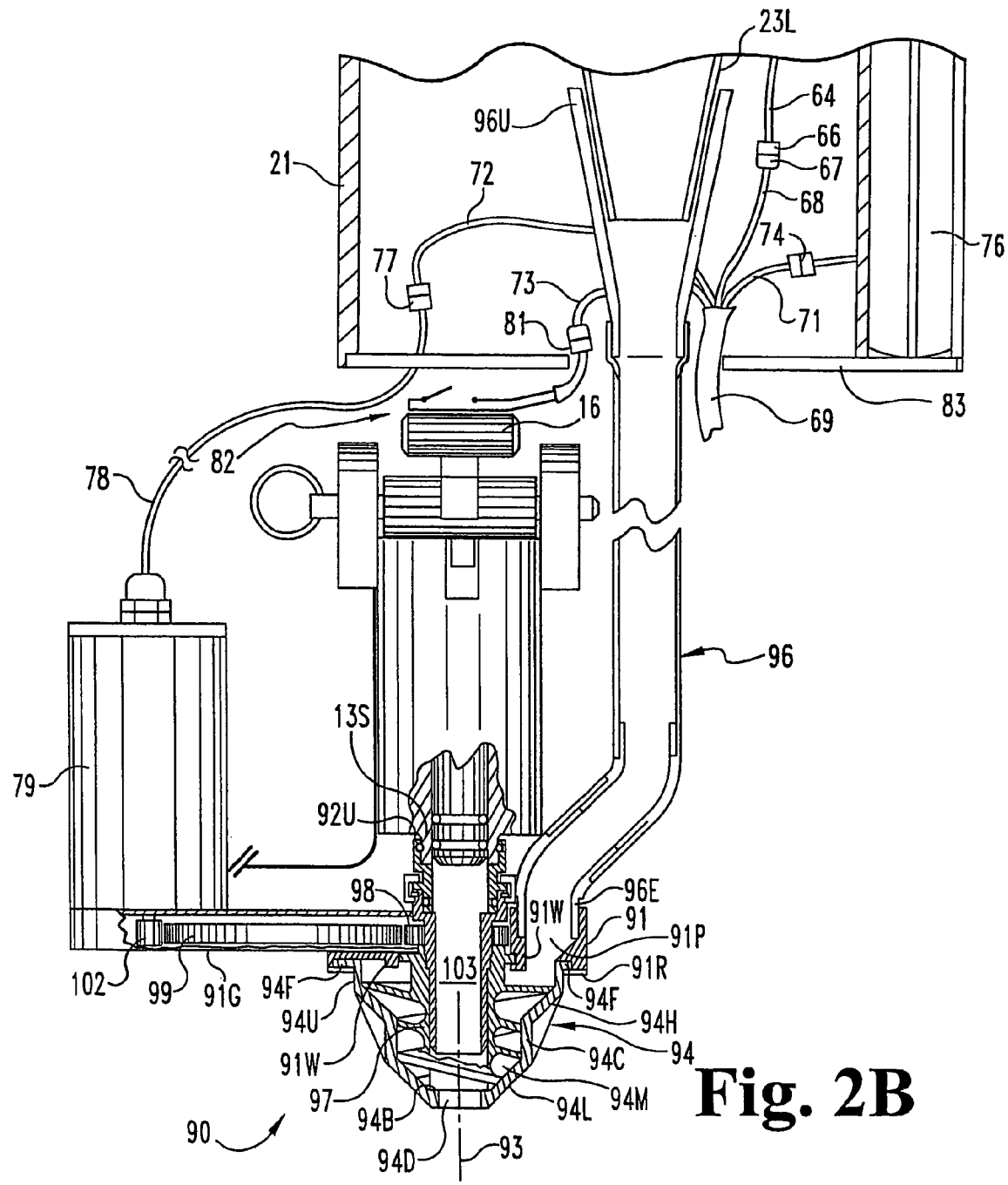
FIG. 2B is a front view in section on the same scale as FIG. 2A and showing a blender assembly.
Figure 3:
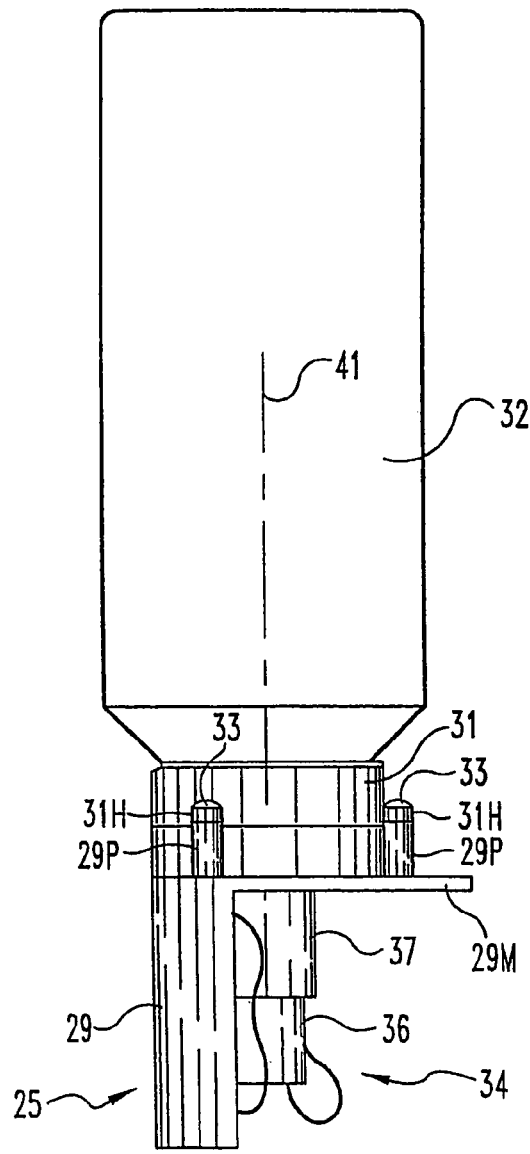
FIG. 3 is a side view of an ingredient container module.
Figure 4:
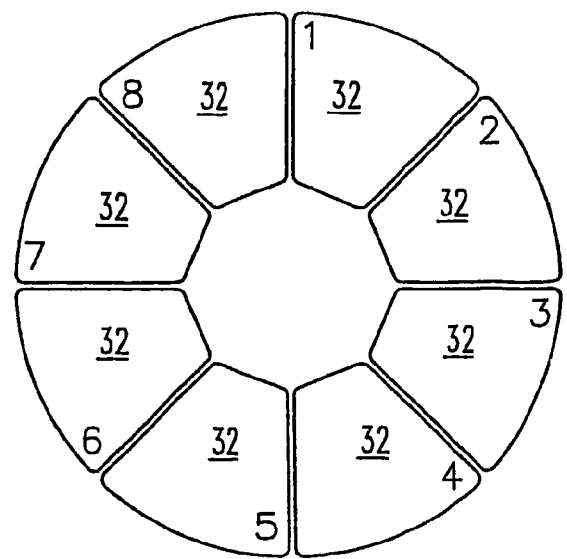
FIG. 4 is a top plan view of an array of eight ingredient containers on a scale intermediate FIGS. 1 and 3.
Figure 5:
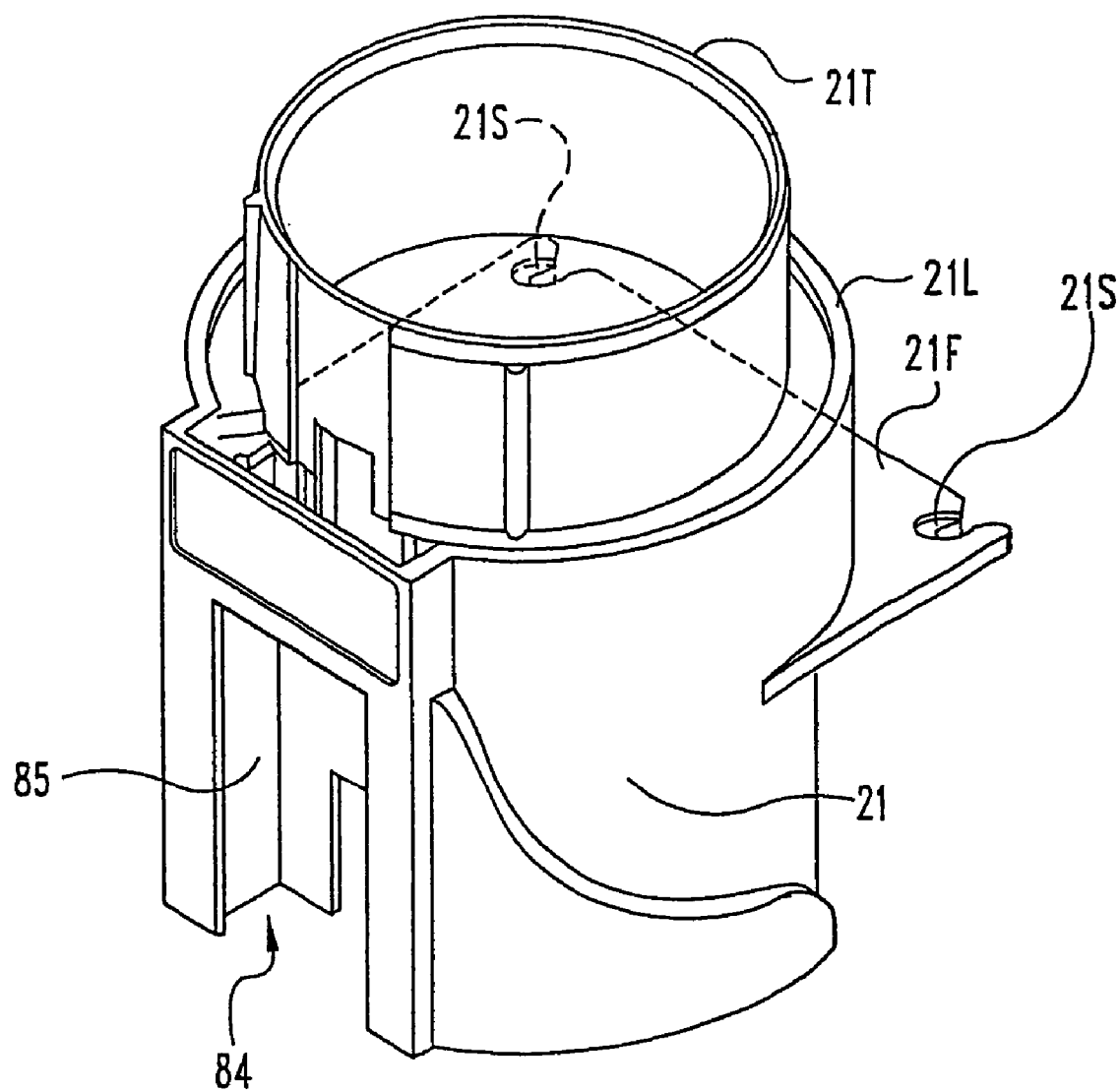
FIG. 5 is a perspective view of a mounting base for the ingredient storage assembly.
Figure 6:
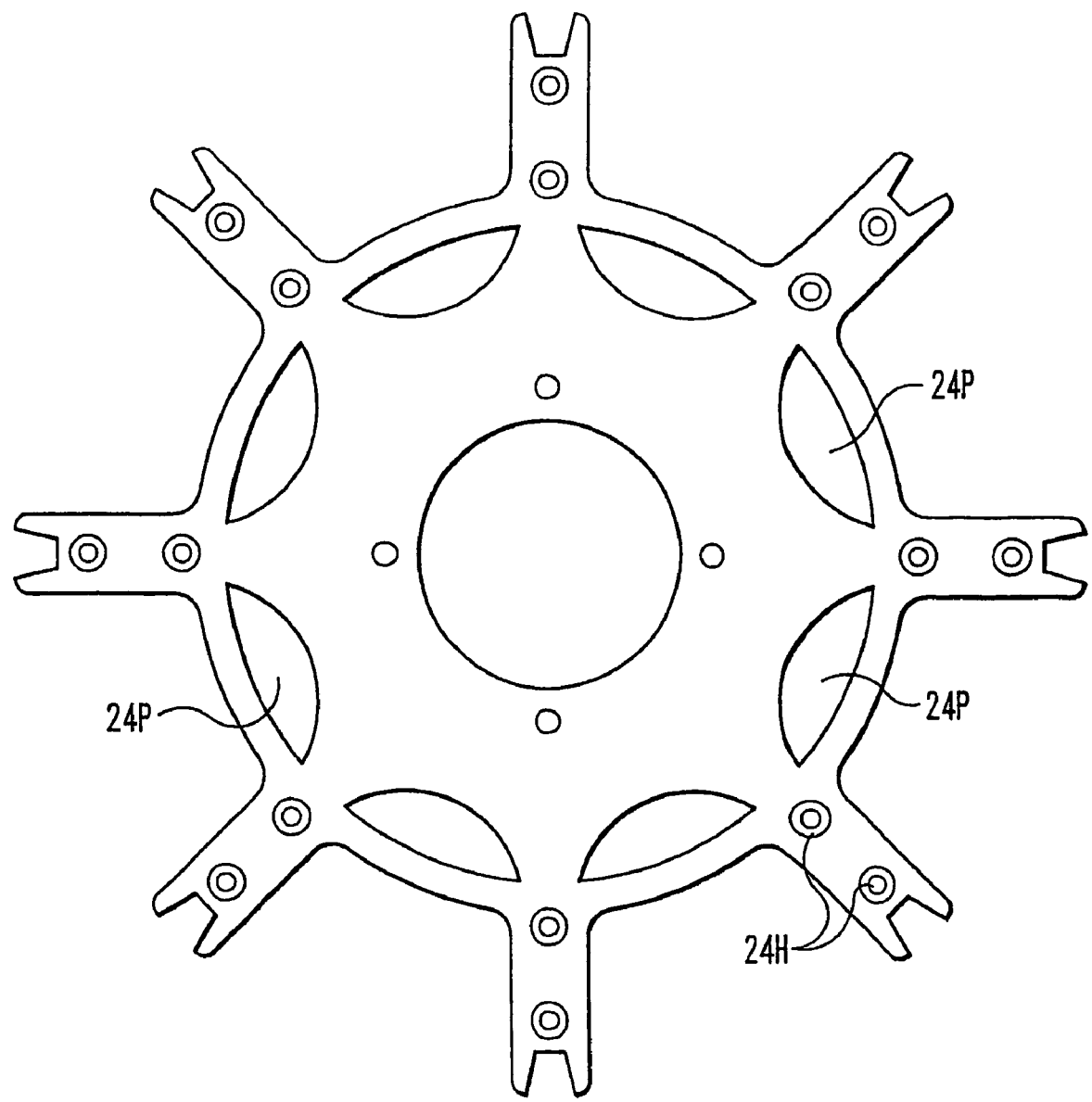
FIG. 6 is a face view of an upper support plate for the ingredient storage assembly.
Figure 7:
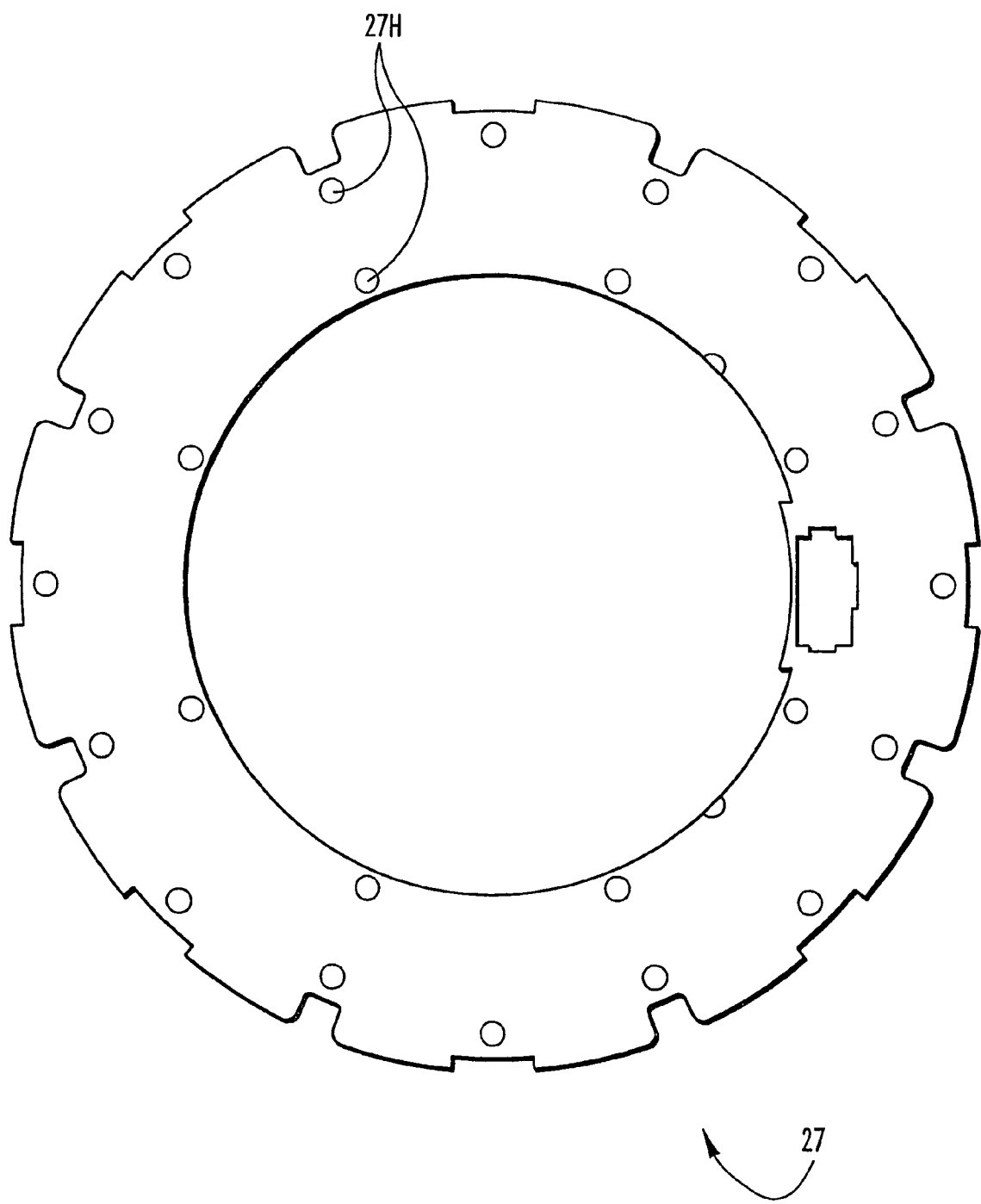
FIG. 7 is a face view of a lower support plate for the ingredient storage assembly.

The illustrated transfer tubing 96 comprises lengths of transparent PVC plastic with assorted shapes assembled to adapt to the particular freezer configuration. The tubing has a conical upper end portion 96U receiving the tapered lower end portion 23L of hopper 23. As can be seen in FIG. 2B, while the lower end portion of the dispensing hopper 23, and the upper end portion 96U of the tubing 96 are conical in shape to fit well together and avoid entry of dirt into the tubing 96, they are not wedged together. Being a slip-fit, the dispensing hopper and assembly above it can be separated easily from the apparatus below it if, and when desired. The lower end of tubing 96 has the elbow 96E received in one of the ports 91P of the housing 91. The unused port (or ports, if provided) 91P can be closed by a cap or caps such as 91T in FIG. 11.

In the illustrated example, the blender hopper 94 (FIGS. 12 and 15), usefully made of molded plastic, is shown in the form of a stepped conical device having two diametrically opposite outwardly-extending top flanges 94F, each extending approximately 60 degrees about axis 93. The blender hopper is mounted to the bottom of the housing 91 by placing the top edge of the hopper against the bottom face of the housing. Then the hopper is turned clockwise (as viewed from above) to move the hopper flanges 94F into position in grooves formed between arcuate retainer clips 91R (FIG. 2B) and flanges 91B (FIG. 18) on the bottom of the housing. The retainer clips are of the same shape as the flanges 91B and are screwed into the bottom of housing 91 at flanges 91B (FIG. 18).

The hopper has an inner wall surface which is stepped. In the illustrated example, the wall surface includes an upper cylindrical portion 94U with flanges 94F at the top, the upper portion extending downward to a first circle. An upper conical portion 94H extends downward from the first circle to a second circle. A second cylindrical portion 94C extends downward from the second circle to a third circle. A second conical portion 94L extends downward from the third circle to a fourth circle at the bottom of the hopper. A blending chamber 94M is surrounded by the lower portion 94L of the hopper.

The blender hopper surrounds a blending auger 97 of the screw type and which is centered on axis 93. The blending auger has a gear 98 integral with it or affixed to it and driven by a gear set 99 in a drive housing portion 91G of housing 91. At this point it should be mentioned that, while FIG. 1 shows tubing 96 entering housing 91 at a port location offset from and forward of axis 93, FIG. 2B shows tubing 96 entering the housing at 91P to the right of axis 93. As mentioned above, the two ports are available for the use of whichever one or both are convenient, depending on the configuration of the freezer. Also, if desired, locations of the ports relative to each other and to the drive housing portion 91G can be different from shown. There is an opening 91H (FIG. 18) through wall 91W in the proximal end of drive housing portion 91G where one of the gears in the gear set 99 engages gear 98 on the auger, as shown in FIG. 2B. The gear set is driven by a pinion 102 on the output shaft of blender motor 79 mounted to the distal end of the drive housing portion 91G.

Figure 12:
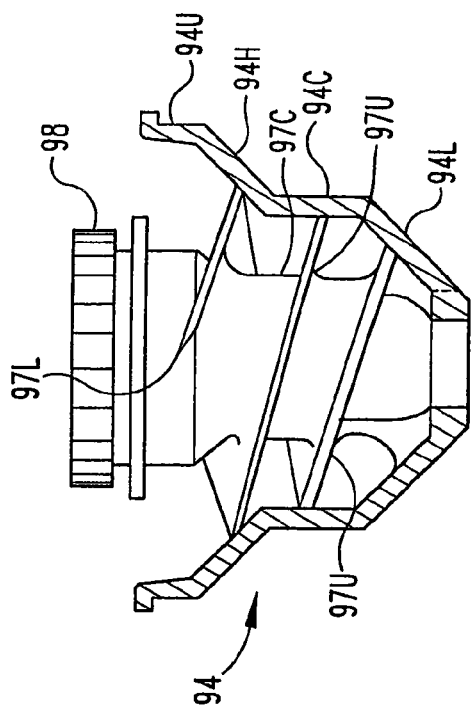
FIG. 12 is an elevation view of the auger in the hopper shown in section and viewed in the direction of arrows 12-12 in FIG. 11.

The housing ports 91P open downward into a space 91C (FIG. 11) under the cylindrical inner wall 91W of the housing 91 and open to the upper ends of the screw flights of auger 97. The blending auger 97 (FIGS. 9-14), which may usefully made of molded plastic, has a central, axially extending hollow core 97C (FIG. 10) on which there are two helical flights 97A and 97B, each of which is centered relative to axis 93. Each of the flights has a leading edge which is beveled downward and rearward as shown at 97L (FIG. 12). Each flight is contoured to have a profile which fits the profile of the stepped conical inside wall surface 94H, 94C and 94L of the blender hopper 94. Thus, it is seen that the auger flights have a profile contoured to sweep the inside space of the blender hopper outboard of the auger core as the auger is rotated on axis 93. To improve the efficiency of the auger, the perimeter of each flight has an edge which is cylindrical or beveled to conform to where it is axially along the auger relative to the inside wall surface of the hopper.

A tube 103 is a stationary tube having a longitudinal axis co-linear with axis 93, and is fixed to the housing 91. The tube delivers the flow of the frozen base product from the freezer to the blending chamber 94M. The tube also serves as an axle spindle for rotational bearing of the auger. The lower end 103B of the tube 103 is spaced above the base 94B of the blender hopper. The resulting space between the end of the tube 103 and the base 94B of the blender hopper allows the solids delivered by the auger to enter into the flow path of the frozen base product.

While the frozen base product flows, the auger 97 rotates clockwise (viewed from above) on the tube 103 and delivers the selected solids into the blending chamber 94M. The inside diameter d1 (FIG. 14) of the tube 103 is less than the overall maximum diametrical dimension d2 (FIGS. 14 and 15) of the fluted hopper outlet opening 94D. This allows unrestricted flow from the tube 103 through the blending chamber 94M and then through the hopper outlet opening 94D (FIG. 14). This size differential allows for the inclusion of the solids into the frozen base product in the blending chamber 94M for delivery of the blended product out through the blended product outlet opening 94D. It should be understood that the outlet opening can be circular or other shapes.

Two diametrically opposite cutouts 97P (FIGS. 9 and 11) in the auger core 97C near the bottom of the auger 97, allow the solids to be introduced into the flow path of the frozen base product while the auger 97 is rotating. The rotation of the auger 97, at approximately 400 rpm, inhibits the frozen base product from entering the outer circumference of the blending chamber 94M and working upward along hopper wall surface 94L. The rapid rotation of the auger 97 tends to confine flow of the base product to a flow path directly downward from the opening of the tube 103 and through the opening 94D.

The two helical flights 97A and 97B of the auger 97 are each provided with a two-step diminishing radius (with respect to the rotational axis 93). This diminishing radius provides a swept volume profile by the rotating auger and which fits the above-mentioned contour profile of the stepped inside wall surface (94H, 94C and 94L) of the blender hopper 94. The diminishing radius of the contoured wall of the blending chamber 94M causes the solids to be forced inward toward the flow path of the frozen base product. The diminishing radius also counters the tendency for the base product to flow to the outer perimeters of the blending chamber 94M. The diametrically opposite cutouts 97P in the core wall of the auger, enable the solids to be forced inwardly into the frozen base product as it flows from the lower end 103L of the tube to the outlet opening 94D.

The cutouts 97P through the core wall under flights 97A and 97B at the bottom faces such as 97U (FIGS. 9-14) may be formed in or cut in or otherwise provided in a material. Therefore the term "cutout" should not be construed as limited to an opening that is cut into the material.

Figure 10:
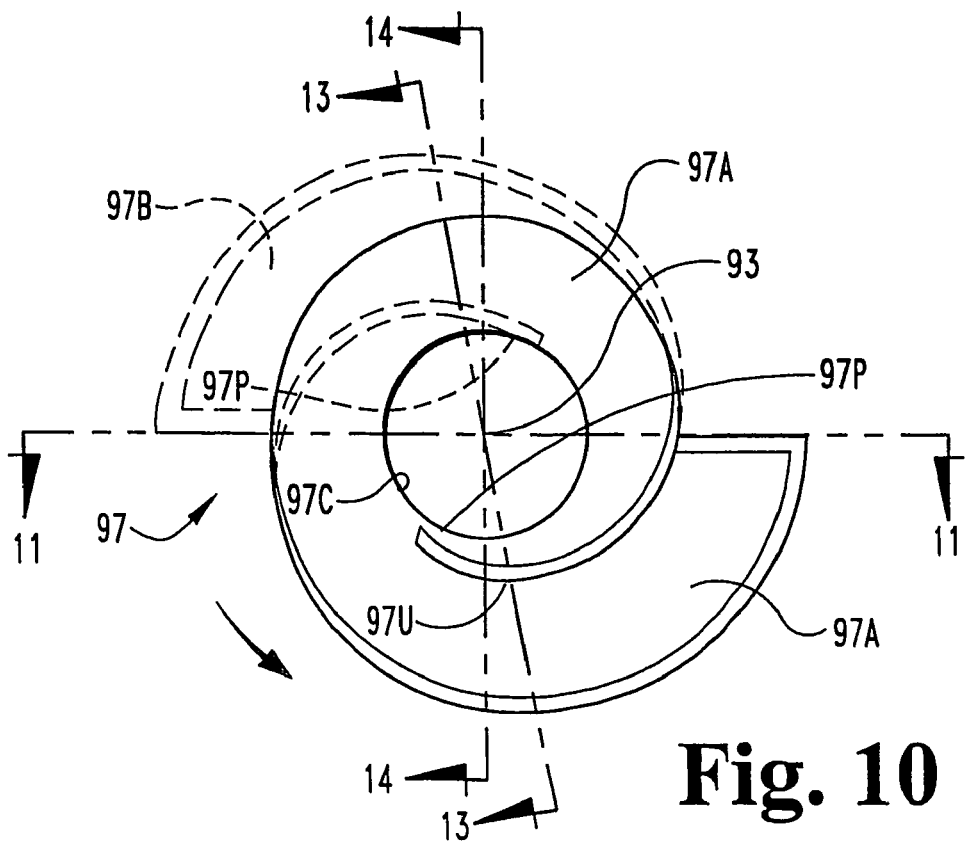
FIG. 10 is a bottom view of the blending auger.

FIG. 13 shows the core wall portions at section 13-13 in FIG. 10, immediately uphill of the beginning of the cutouts 97. FIG. 14 shows where the inner surface of the core flares outward in curves at section 14-14 to blend into the bottom faces of flights 97A and 97B immediately below where the cutouts begin downward toward the lower ends of the flights.

Figure 11:
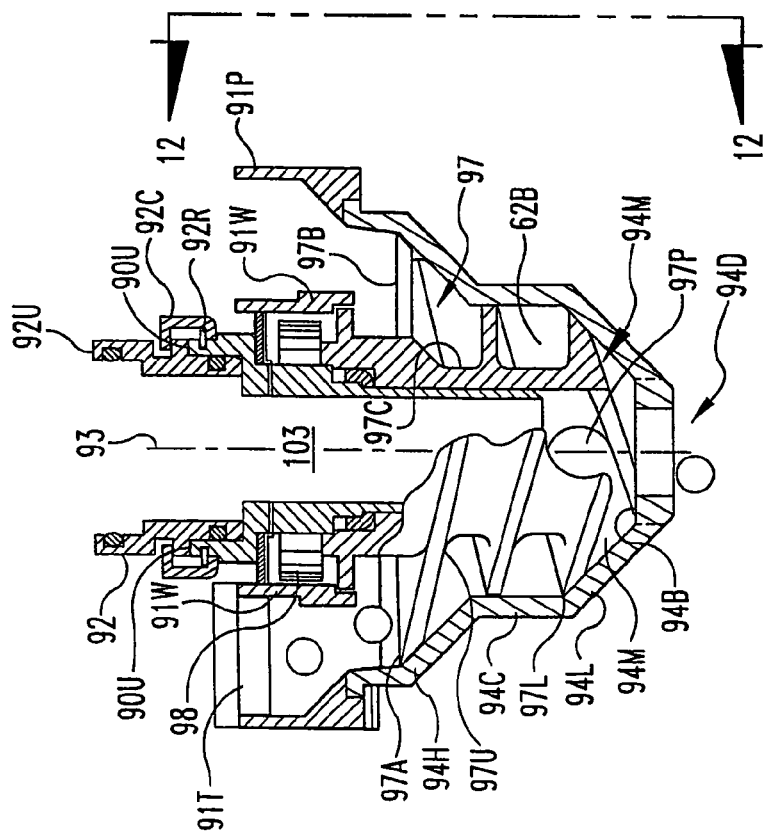
FIG. 11 is a fragmentary longitudinal sectional view taken at line 11-11 in FIG. 10, viewed in the direction of the arrows and showing the blending auger in a blender hopper which is shown in full section.

This provides easy entrance of solids into the frozen base product stream under the lower end 103L of tube 103 flowing to outlet 94D as the auger rotates in the direction of arrow 104 (FIG. 10), which is clockwise when viewed from the top of the auger. Portions of the inside wall of the core 97C continues down as shown in FIGS. 11 and 14 supporting the tips 97T of the flights in cantilever fashion at the bottom ends of the flights.

It should be noted that while it is very convenient, and preferred to have the auger axis in line with the axis direction of discharge of base product from the freezer, it is not absolutely necessary. Also, while it is preferred to have the passageway from the spigot through the blender provided by a tube which also serves as the bearing axle for the auger, the auger axis could be offset from the tube axis. Also, while the tube can serve directly as the bearing for the auger, as shown, it could simply serve as a mounting for separate bearings.

Referring to FIG. 18, the data entry panel (DEP) 76 has numerals 1-8, each designating a "key" by which the dispenser operator can select a different one of the eight ingredient containers. It also has several other "key" identifying legends on it, including a "cancel entry" legend, a "+", a "−", and an "alt time adj" legend. It also has an "output level" indicator light emitting diode set with eight enumerated levels, and an "overload" indicator light.

Operation of FIGS. 1-19 Embodiment

As indicated above, the embodiments of the invention are intended to be attached to a freezer capable of delivering an icy base product, to blend or mix various ingredient solids into the base product as it flows from the freezer toward a customer's serving cup. The system example described above accommodates eight different ingredients. The operator can select a single ingredient or up to as many as eight different ingredients to be blended into a single serving of the frozen base product.

To dispense a serving to a customer, the operator determines the output level (the duration of time of operation of each of the selected ingredients) per cycle of dispensing ingredients requested by the customer. Then the operator touches those of the selector "keys" needed for the ingredients requested by the customer. This sets up the program for the controller 61 to activate, in sequence, the dispensing motors 36 for those of the eight containers holding the ingredients requested by the customer. Then the operator pulls the draw handle 16 down, enabling the frozen base product to flow down through the auger axis passageway in tube 103. When the operator pulls the draw handle down, the draw switch 82 is closed which activates the dispensing motor 36 in the dispensing module that represents the lowest numbered choice in the operator's selection 1-8. As the motor activates, it rotates the transfer impeller 38 that takes the ingredient solids from the selected container 32 and transfers them to the registering openings 29H, 24P dropping the solids into the dispensing hopper 23. The transfer impeller serves both as a valve and a device to transfer the ingredients toward the dispenser hopper 23. The solids flow down through the transfer tubing 96 into the blender hopper 94 and down through the hopper under control of the auger 97, into the blender chamber 94M where the solids are integrated into the frozen base product as the base product flows out of the lower end of tube 103.

At the same time that the draw switch is closed to start the dispensing process, the blender motor 79 is activated, rotating the blending auger 97 in a clockwise direction (viewed from above) to force the ingredient solids into the frozen base product while it flows from the tube through the hopper outlet opening 94D into a cone or dish for the customer. If the operator has selected a multiple of possible choices of ingredients, the system dispenses each choice singularly and in the ascending sequence of the numbers of the choices selected on the DEP (data entry panel) 76. The operating time is equal for each dispensing module during a sequence through the operator's selection. When the system has sequenced through all of the choices (completed a cycle), it returns to the initial choice and continues the rotation through the selected choices until the operator chooses to discontinue the process by closing the spigot draw handle. The operating time for each module can be changed to increase or decrease the cycle time for each serving, by touching the "alt time adj" "key" and the "+" or "−" key. As the operator changes the cycle time, the "output level" lights are illuminated accordingly to indicate the output of the solids into the frozen base product. For example, if the adjustment is such that light 9 is on, it indicates that each module in a selection following the "alt time adj" adjustment will dispense solids longer in a cycle than if the adjustment were such that light 6 was on. The average typical cycle time is 1 second. The preferred minimum cycle time is 0.2 seconds. The preferred maximum cycle time is 2.0 seconds. Other cycle characteristics can be specified, if desired. The draw duration is typically between 5 and 10 seconds. This depends primarily upon the size of serving to be delivered to the customer, and the delivery speed of which the freezer is capable. In any case, the controller 61 will repeat the cycling through the choices as long as the draw switch 82 remains closed. It should be understood that some freezers have switch keys, rather than handles to operate a switch to draw the frozen base product from the freezer. In such cases, such switch can be used instead of switch 82 to operate the apparatus of the present invention. Therefore the term "switch" where used in the claims which follow herein, should not be construed as limited to a separate, handle operated switch, except where required by claim context.

To refill a container, the module is removed by loosening the retaining knob 51, and pulling the module radially outward. Then it is inverted, so that the container 32 is upright. Then the module is pulled upward off the container. Then the container can be refilled with the same ingredient, or cleaned and refilled with some other ingredient.

From the above description, it can be recognized that all of the disclosed apparatus can be easily disassembled for cleaning, and then re-assembled.

The apparatus can be powered conveniently by any suitable electric source, an example being a power supply portion of controller 61 and operable on either 110 or 220 volts at 50 or 60 hertz.

The above description refers to the use of a draw handle to initiate delivery of base product from the freezer, and delivery through a spigot, and a switch associated with the draw handle to initiate operation of the dispenser motors and the auger. It should be noted that the invention is useful on a variety of freezers. Therefore, initiation of flow of the base product and controller functions can be triggered by some initiator other than a draw handle. Examples include but are not limited to a switch key or a sound or voice-activated switch. The use of the term "key" should be understood to mean some activator spot or device responsive to the operator's command, however delivered. Wiring, electronics and software for the selector and controller to produce the functions described herein are well within the skill of the art, and description herein would be superfluous.

FIGS. 20-23 Embodiments

Referring now to FIGS. 20-23, components which are the same as in the previously described embodiment are given the same reference numerals. Those which differ provide additional features of these embodiments of the invention. The soft-serve ice cream freezer assembly 11 has the spigot assembly 13 mounted on the front plate 14 mounted on the freezer. The spigot has an operating handle 16 which operates in the same manner as described above. The ingredient storage and transfer assembly can be mounted as described above. The blender assembly 90 is coupled to the spigot 13 by an adapter 192 (FIG. 21) having the upper end 192U received on and sealed by an O-ring to the spigot spout 13S. Some of the components in the blender assembly are the same as in FIG. 11 described above.

Figure 21:
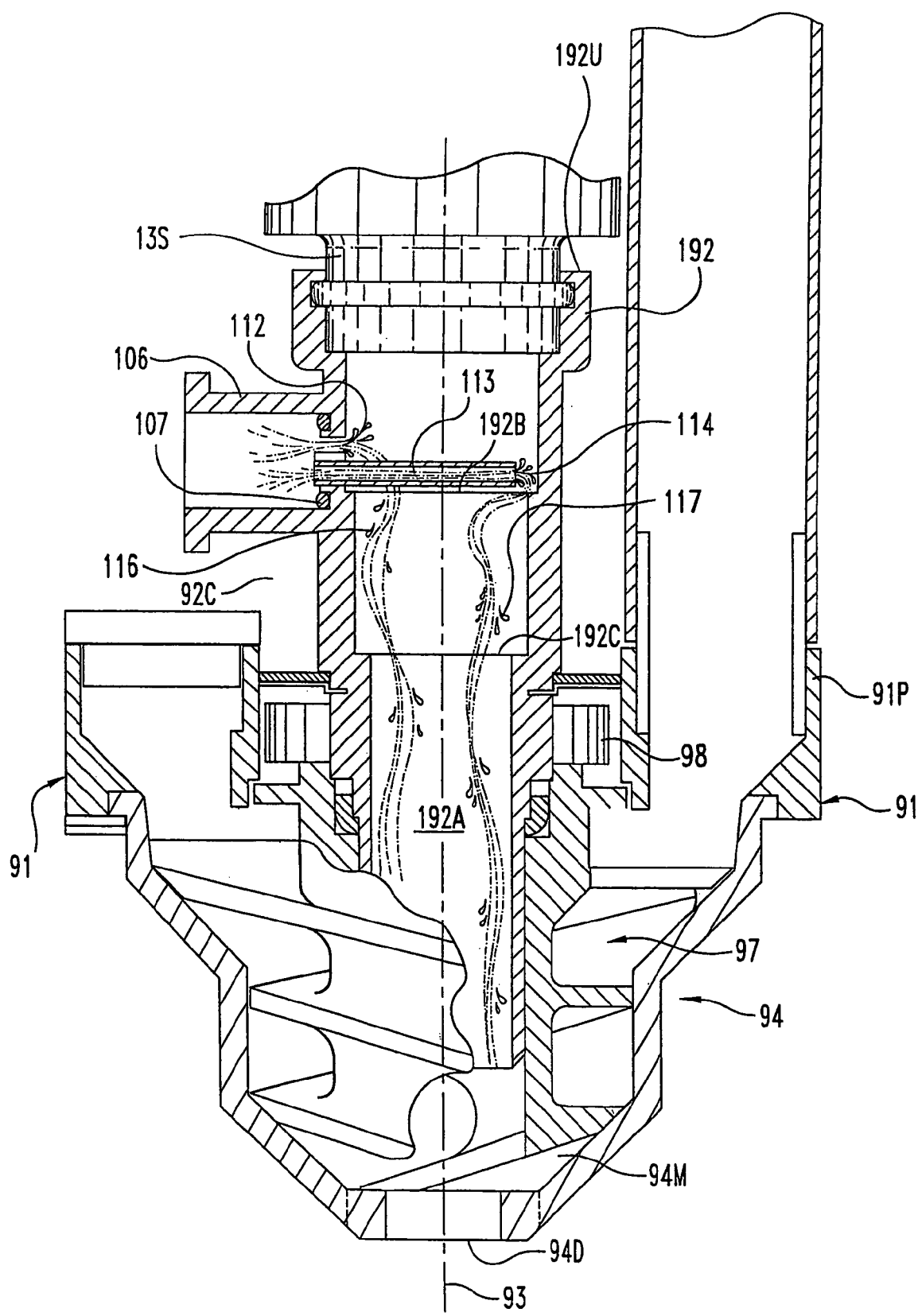
FIG. 21 is an enlarged fragmentary sectional view similar to that of FIG. 11 but adding flavoring syrup introduction features according to the second embodiment of the invention.

The adapter 192 of FIG. 21 is different from that in FIG. 11 in several respects. It is one piece of material fitting directly onto spigot spout 13S. It incorporates directly, an auger axis portion 192A. Also, it incorporates directly, fitting receiver 106 which is coupled to a flavoring syrup storage and delivery module 108 such as module 12 in my U.S. Pat. No. 6,689,410 B2 issued Feb. 10, 2004, hereinafter sometimes referred to as the '410 patent', the content of which is incorporated herein in its entirety by reference. More specifically, the receiver 106 receives a manifold such as 34 in the '410 patent. A snap lock fitting assembly 110, like fitting 37 of the '410 patent is received on the receiver 106 and connected to a supply line fitting 105 like fitting 38 of the '410 patent. Other types of connectors and fittings can be used.

Module 108 is like that in the '410 patent in that it has liquid containers 9, containing liquids having different characteristics such as for flavoring, coloring, or adding carbonation, for example. These liquids can be added selectively, to the base mix which flows down from the spigot 13.

Module 108 receives power from controller 61. A syrup flavor command module 111 like module 1 in the '410 patent is coupled to module 108 like module 12 in the '410 patent, for receiving power from module 108 and for selection and control of flavors, also as described with reference to module 12 in the '410 patent.

The syrup receiver 106 communicates with a port 112 in the wall of the adapter 192. It also communicates with a tube 113 which extends through the wall of adapter 192 and across the interior of the adapter to an end opening 114 of tube 113. This opening is spaced from the tube wall opposite the port 112 of the tube. In this way, syrup (indicated schematically by the droplets 116 and 117) can enter the flow of the frozen base product being dispensed from the spigot, for flavoring of the frozen base product as it moves toward departure from the lower end of the tube portion 192A. At this point the flavoring syrup has mixed well with the base and is further blended with the ingredient solids being augured down through blending hopper into the blending chamber 94M for discharge of the blended and flavored product through the blended product outlet opening 94D.

Another feature of the adapter 192 is a set of steps 192B and 192C on the inside wall. In the illustrated example, the inside wall of the adapter is cylindrical, and so are the steps. Step 192B is a short distance downstream from the liquid additive entrance ports 112 and 114. Step 192C is farther downstream. These steps help the entering additive liquid (syrup, for example) to spread laterally as the frozen base mix flows down the passageway.

In those instances where the frozen base mix is of a consistency more like an ice cream than a shake mix, the rotating action of the auger in the blending chamber 94M causes the flavoring/coloring syrup to "enrobe" the flow of ice cream through the blending chamber 94M. The fluted blended product outlet opening 94D causes the enrobed ice cream to exit the opening in a striped pattern.

The FIG. 21 embodiment of the invention has been described using the '410 patent disclosure as the source of selectable liquid additives. If there are other sources with such capability, perhaps they may be coupled to the blender according to this embodiment.

This FIG. 21 embodiment of the invention provides the opportunity for not only blending solids into the frozen base as in the previously described embodiment, but also selecting one or more liquid additives for the base material. While it is usually preferable to select one flavor for the end product, several can be mixed if desired, just as several different solid ingredients can be included, if desired, in one serving. Also, a flavoring liquid may, and usually will, incorporate a colorant.

Figure 22:
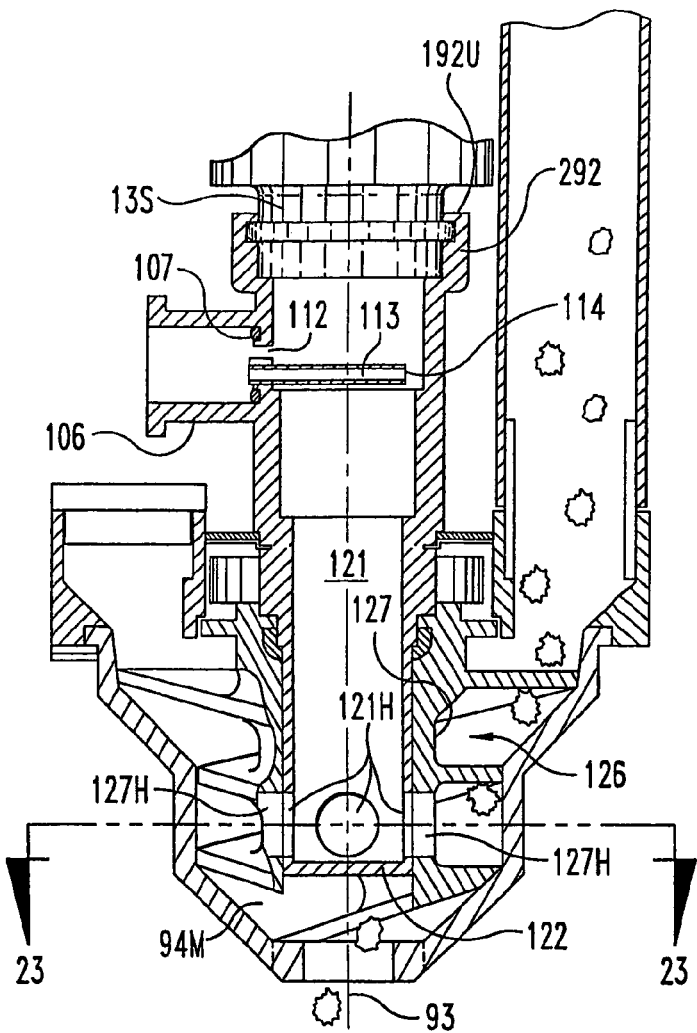
FIG. 22 is a view similar to FIG. 21 but showing a third embodiment of the invention with features for blending fine particulates.
Figure 23:
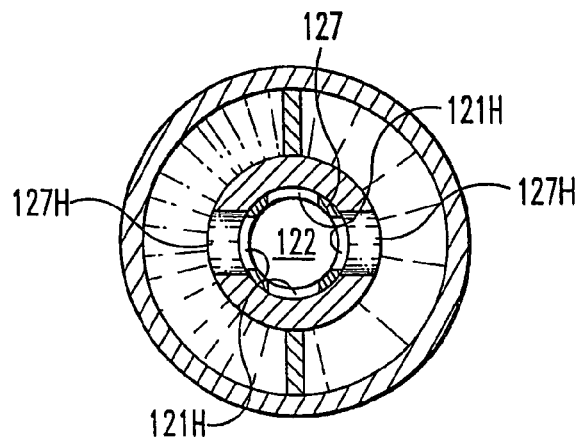
FIG. 23 is a cross-section at line 23-23 in FIG. 22 and viewed in the direction of the arrows.
Figure 26:
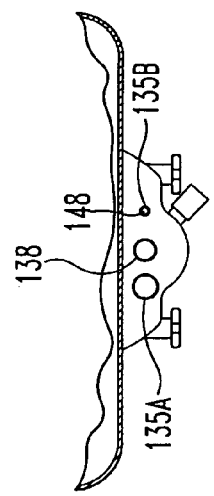
FIG. 26 is a cross section thereof taken at line 26-26 in FIG. 24 and viewed in the direction of the arrows.

Referring now to FIGS. 22 and 23, a third embodiment is disclosed. This embodiment is to facilitate blending into a frozen base product such as for a milk shake, solid materials that have been crushed or otherwise made or reduced in size to 0.350 inches down to fines (particulates 0.125 inches or less maximum dimension in any direction), where total integration of the ingredient into the mix is desirable.

In this embodiment, the features are the same as in the embodiment of FIG. 21 with several exceptions. For example, the auger axis tube/adapter 192 of FIG. 21 is replaced by the tube/adapter 292 in FIGS. 22 and 23. This part is very similar to tube 192 but it has a bulkhead or closed lower end 122. It also has four ports 121H circularly spaced around the axis 93 at 90-degree angles between them. Auger 126 is similar to auger 97 except that auger 126 has a core 127 with two holes 127H at diametrically opposite locations in the wall of the auger core 127 between flights of the auger.

In this embodiment of the invention, as the auger rotates and the two holes 127H in the auger come into alignment or registry with any of the four holes 121H in the tube 121, the frozen base is forced outward through the spindle holes 121H and through the holes 127H in the auger core, and enters the space between the flights of the auger. As this happens, solids moving downward in the auger are blended directly into the frozen base, even before they get to the blending chamber 94M. Further blending of the fines can occur in the blending chamber 94M. The FIGS. 22 and 23 embodiment of the invention also has the adapter and flavoring supply features of the embodiments of FIGS. 20 and 21.

The preferred speed of rotation of the auger in these additional embodiments of FIGS. 21-23 is approximately 400 revolutions per minute. Other speeds and ranges may be used if desired.

Operation of the FIGS. 20-23 Embodiments

The operation of these embodiments is like that described above for the FIGS. 1-19 embodiment. Where fines are to be used and blended into a milk-based product like a shake, for example, the tube with closed bottom end as in FIG. 22, is likely preferred, to get thorough blending of the fines into, rather than just coating the outside of, the base. The FIG. 22 embodiment can be used with, or without, the flavoring feature. If the liquid additives, whether for flavoring or coloring, or both, are to be used, the basic procedure for operation is the same as described above, using the data entry panel 76 of FIG. 19. But, in addition, a flavor command module 111 such as module 1 in the '410 patent will be engaged. For this purpose, the switch 82, supplied with power from controller 61, has an output 80 to command module 111 so that the selected flavoring introduction commences as well as the selected solid introduction when the switch is closed by operation of the draw handle 16 or whatever other device may be used to initiate flow of the frozen base product. The sanitizing feature for the flavor adding equipment described in the '410 patent can be employed, preferably with the flavor adding equipment disconnected from receiver fitting 106.

FIGS. 24-36 Embodiment

Figure 24:
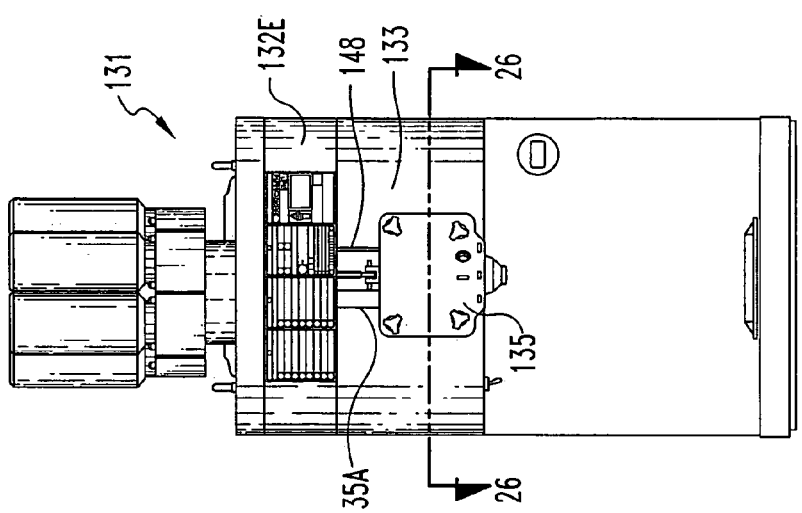
FIG. 24 is a front elevation view of a soft-serve freezer machine according to a fourth embodiment of the invention.
Figure 25:
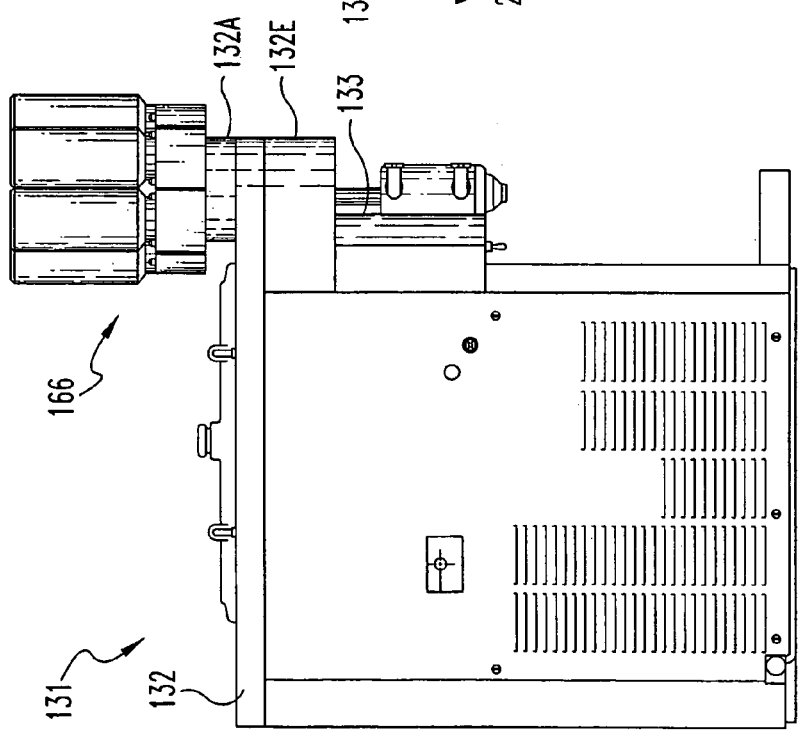
FIG. 25 is a side elevation view thereof.
Figure 29:
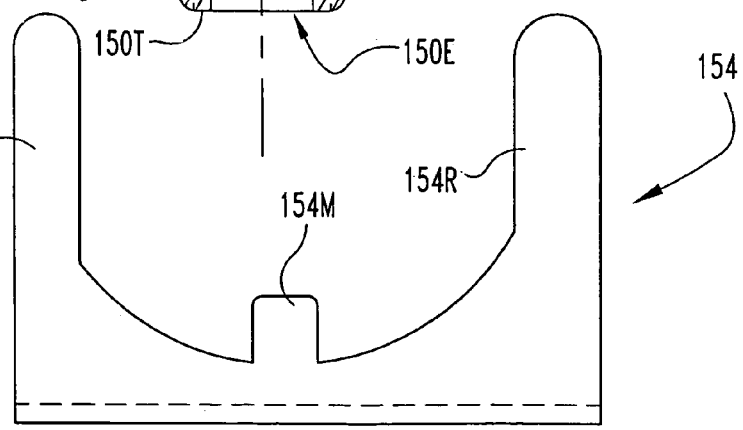
FIG. 29 is an enlarged top plan view of a blender hopper retainer clip to hold the blender hopper in a cavity in the freezer door.
Figure 28A:
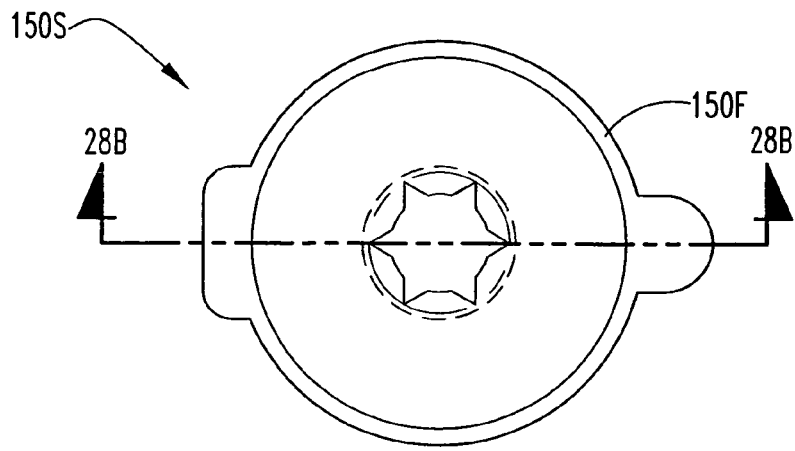
FIG. 28A is top plan view of the blender hopper.
Figure 28B:
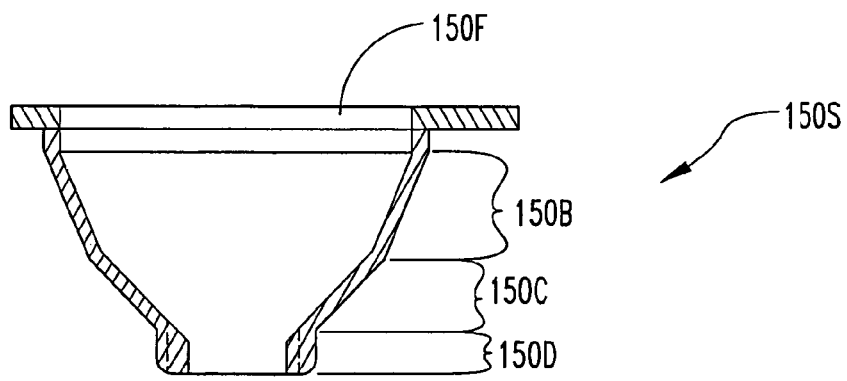
FIG. 28B is a cross section through the blender hopper.
Figure 28C:
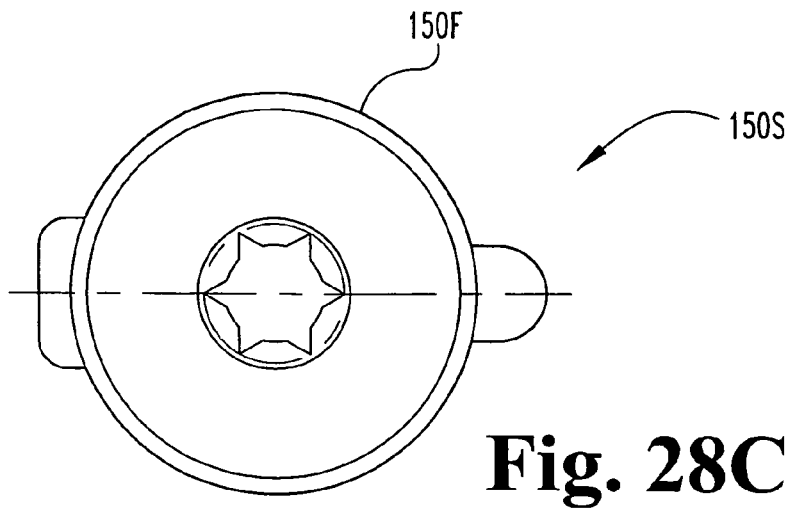
FIG. 28C is bottom view of the blender hopper.
Figure 30:
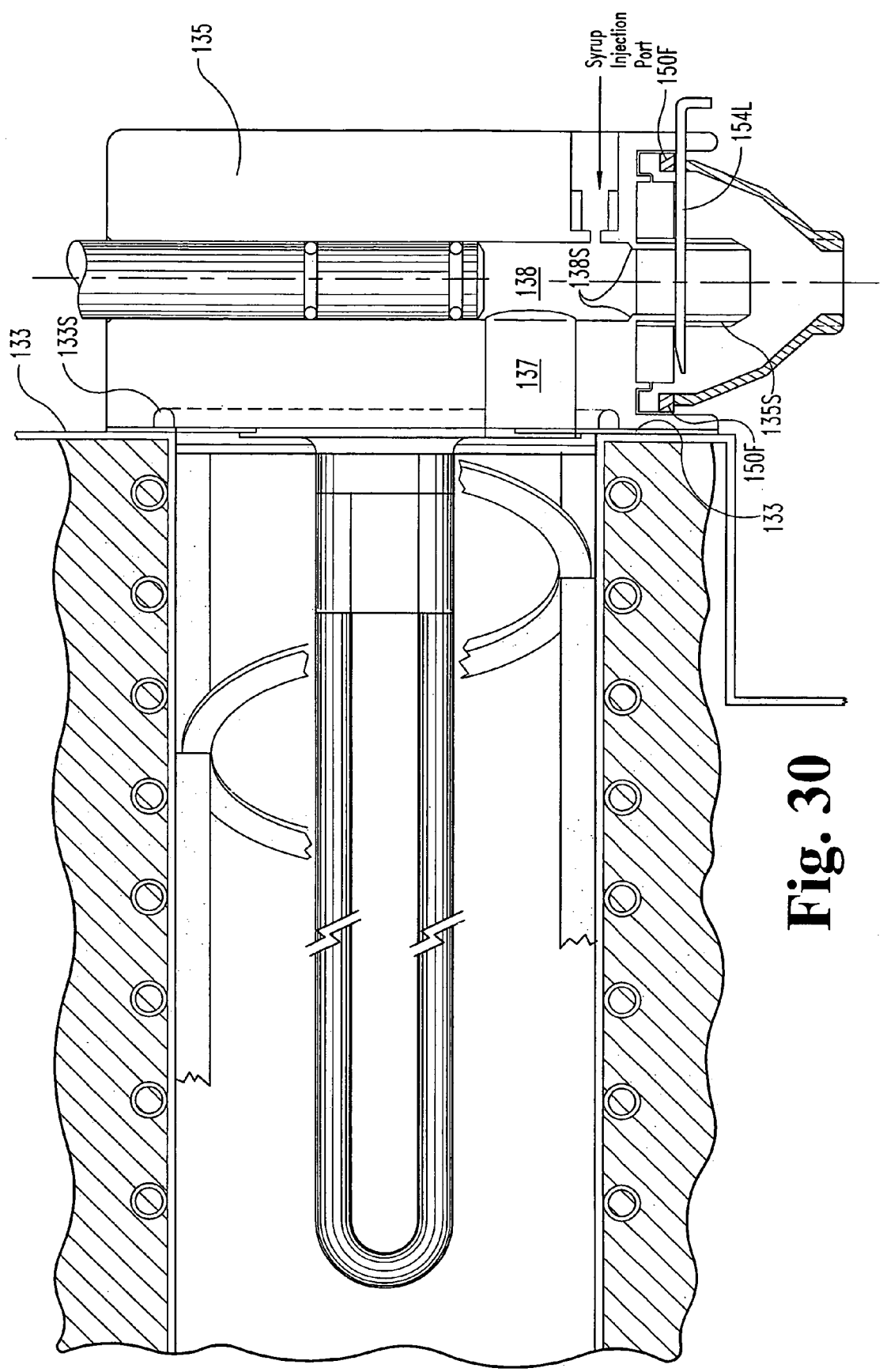
FIG. 30 is a vertical section through the freezer door and a portion of the freezer barrel covered by the door, taken at line 30-30 in FIG. 28 and viewed in the direction of the arrows.

Referring now to FIGS. 24 through 36, the freezer assembly 131 of FIGS. 24 through 27 is a table or countertop model instead of the floor model of FIG. 1, but this is applicable to floor models as well. According to this embodiment of the invention, it is different in a number of respects. The top 132 is similar to the conventional top of the FIG. 1 freezer which is of a type manufactured by Taylor. But in this embodiment of the invention, the top includes a cantilever extension 132E which projects beyond the front 133 of the freezer as shown in FIGS. 25 and 30. The extension also includes a base 132A for mounting a removable carousel assembly 166. A removable lid covers a reservoir (not shown) which is built into the top as in some Taylor brand freezers. But the extra length of the top overhanging the front 133 contains some components different from those in the previously described embodiments. Those will be identified subsequently.

A freezer door 135 is secured to the front of the freezer in conventional manner like the plate (door) 14 of the embodiment of FIG. 1, by four bolts operated by the hand screws 135W. An O-ring 133S seals the door to the freezer front wall around the end of the freezer cylinder. But as shown best in FIGS. 26, 27 and 32, in this (FIGS. 24-36) embodiment of the present invention, there are three vertical holes formed in and extending through the door 135. The hole 135A is provided to receive condiment solid particulates for blending into the base mix. The hole 135B is provided for a passageway for an auger drive pinion shaft 148. The hole 138 provides a cylinder for the plunger piston 143 of the base mix control valve.

Figure 27:
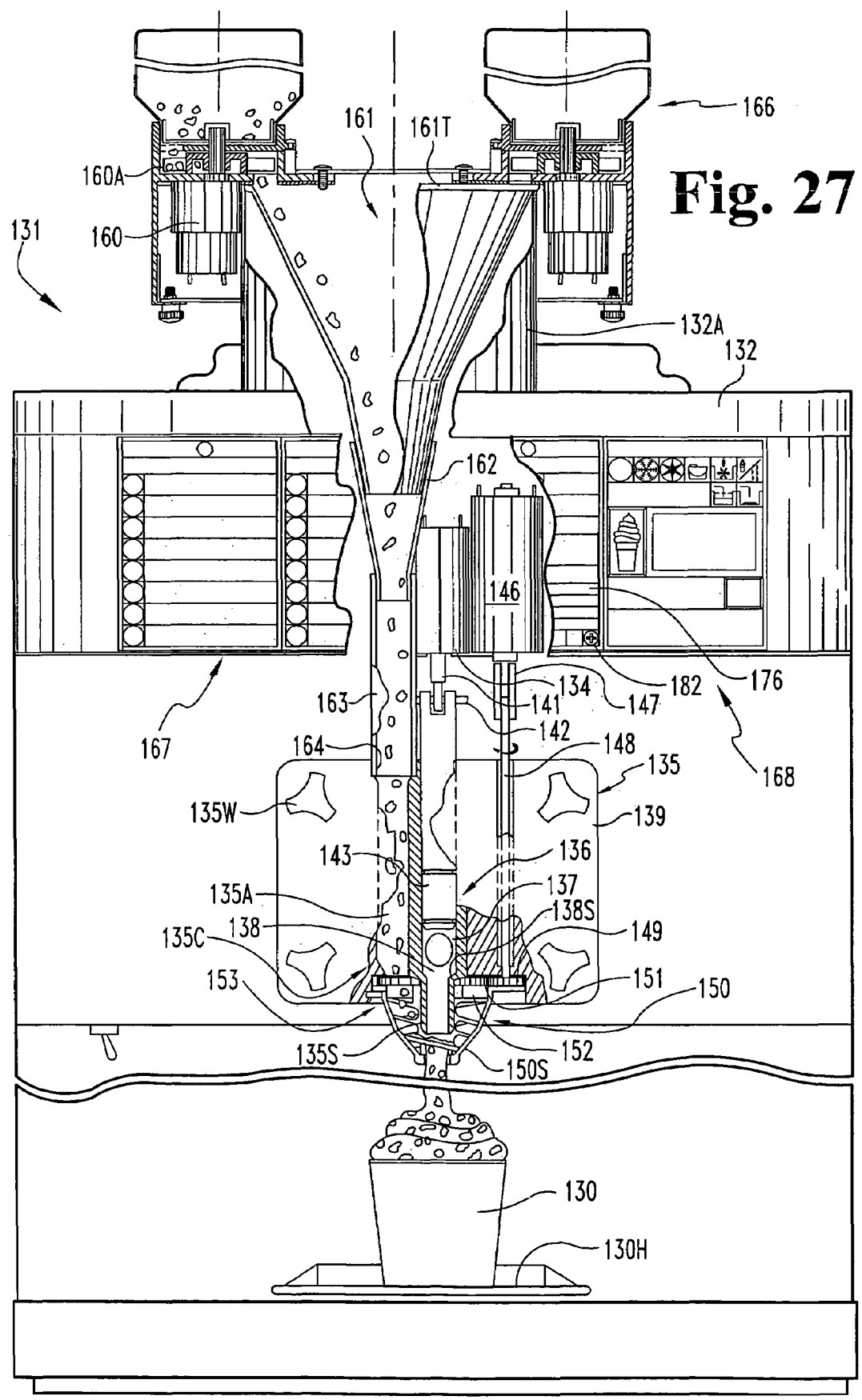
FIG. 27 is an enlarged front elevation view with portions of the exterior broken away to illustrate some interior details, and a portion of the height broken away to conserve height in the drawings.
Figure 28:
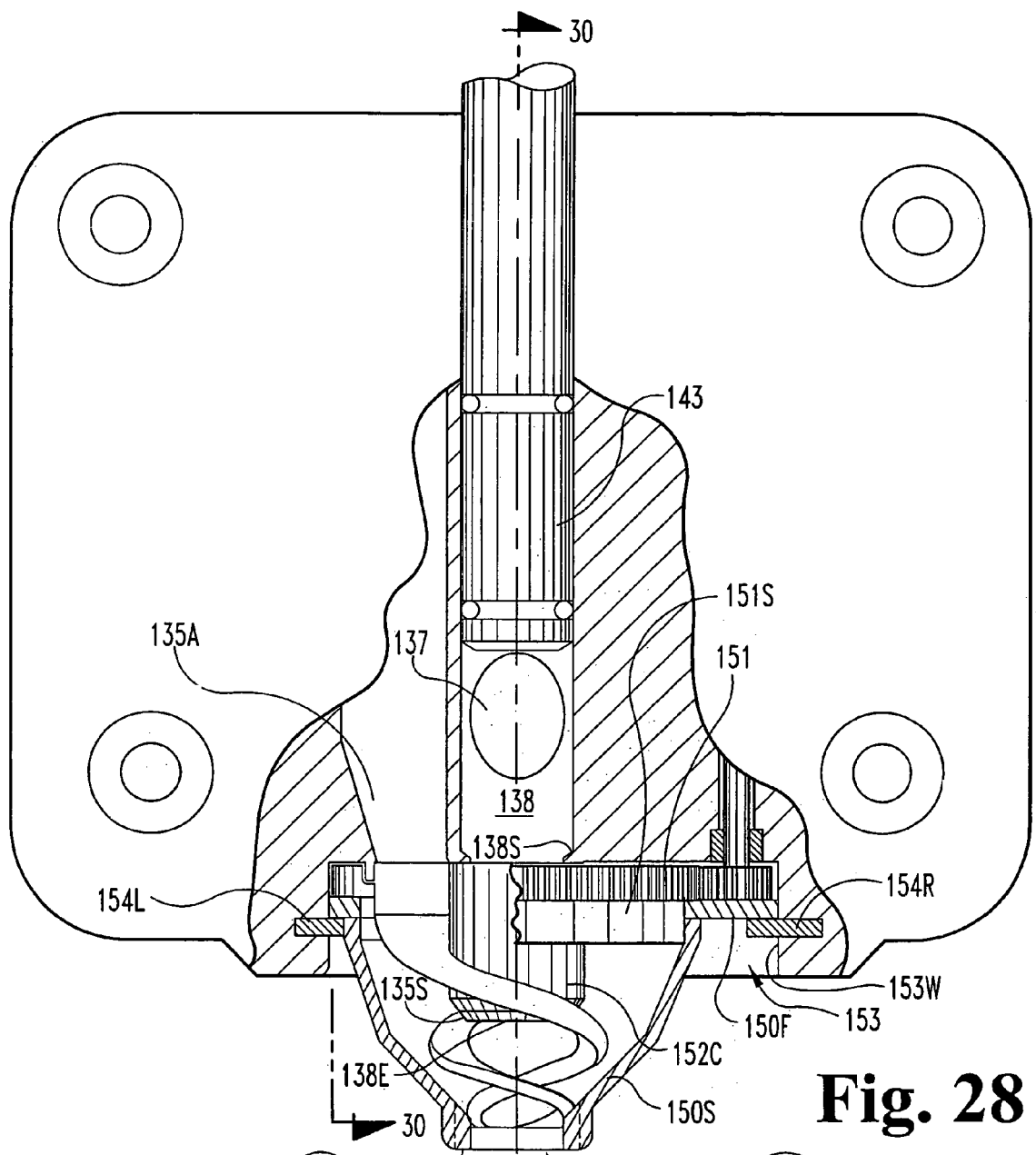
FIG. 28 is an enlarged front elevation view of the freezer door, with a portion broken away to show some interior details.
Figure 33:
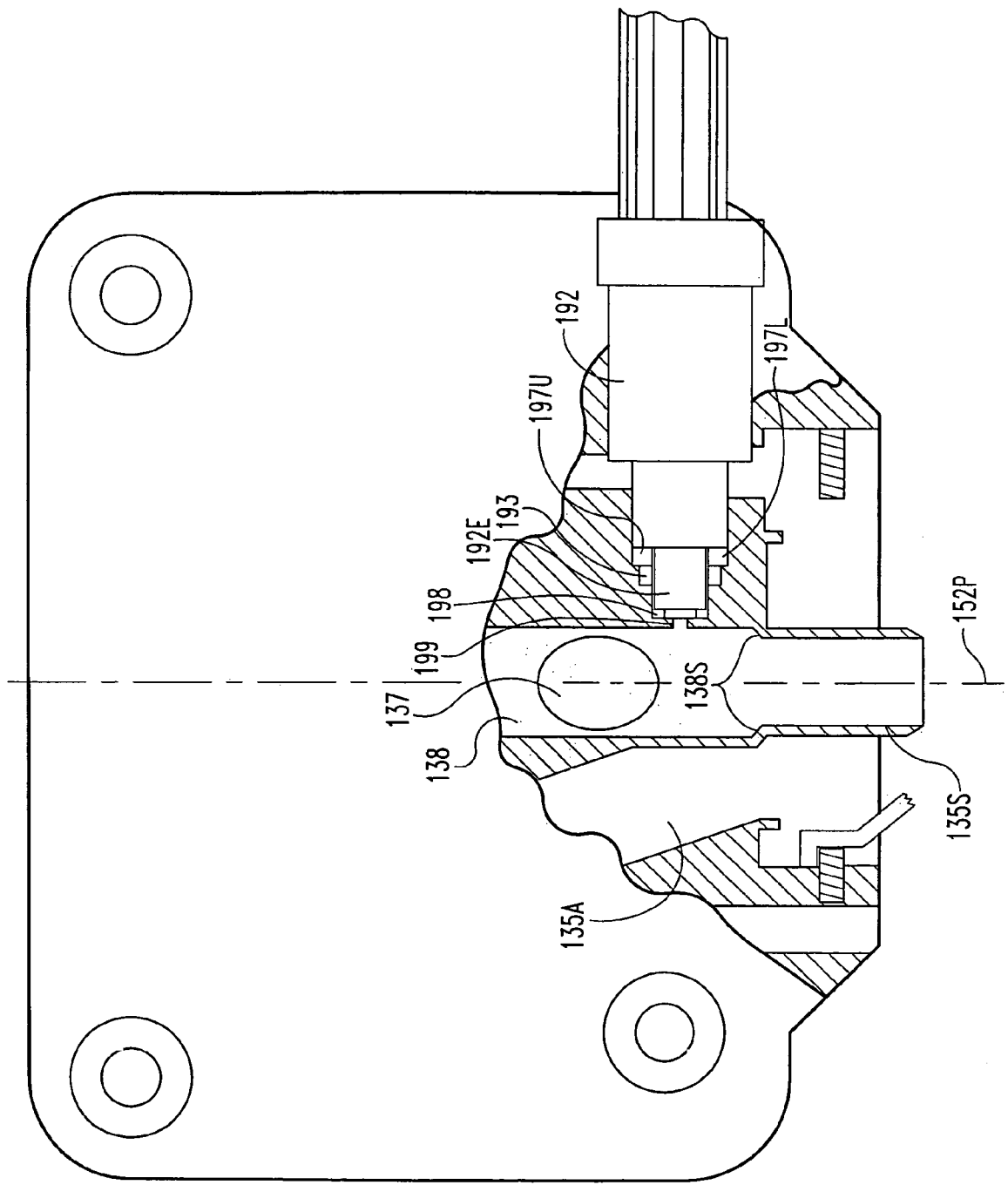
FIG. 33 is a front elevation view of the freezer door with a portion broken away and showing a flavoring syrup injector assembly installed in the injector receiver port in the door.
Figure 34:
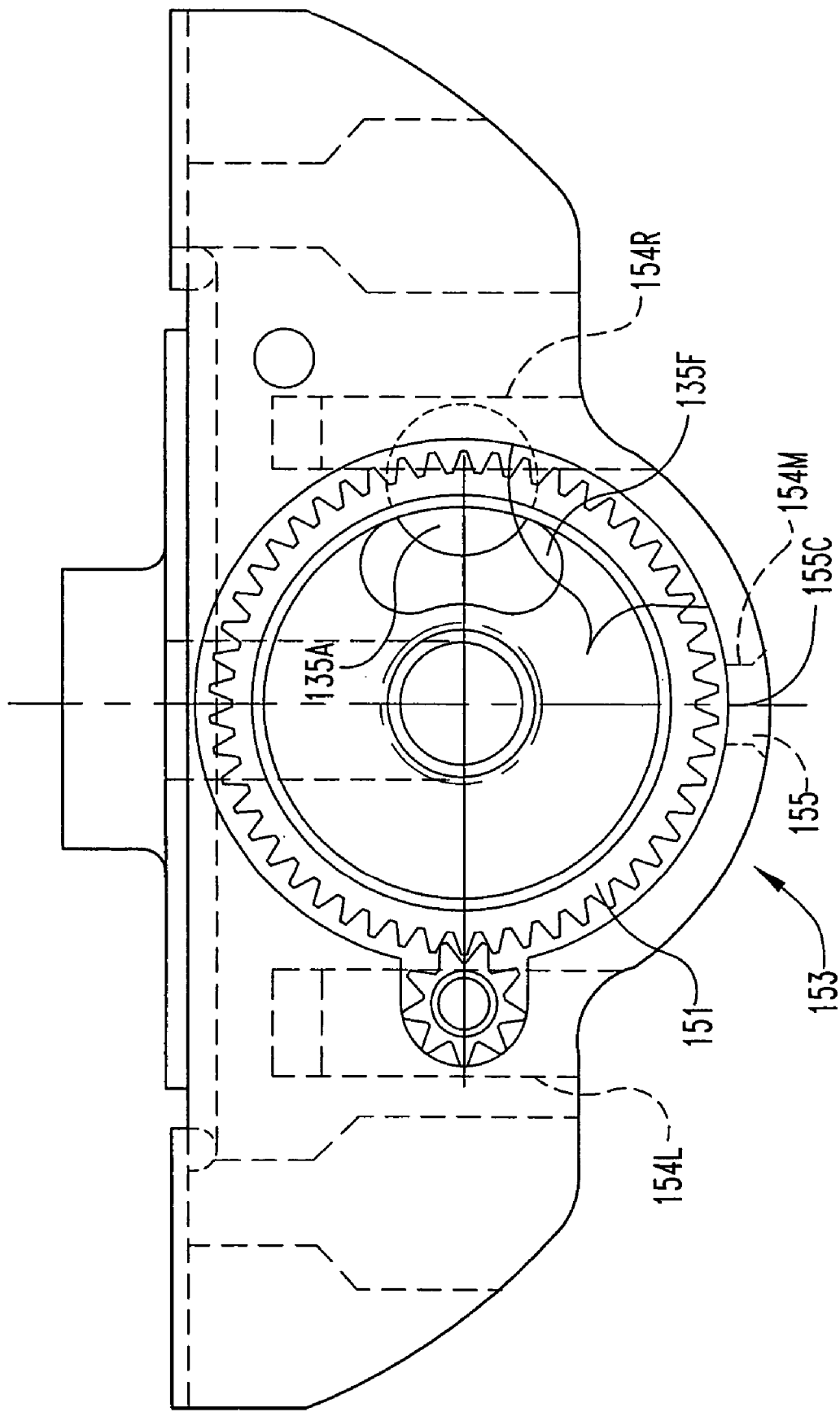
FIG. 34 is a bottom view of the freezer door.

Referring further to the door 135, and FIGS. 27, 28, 33 and particularly the bottom view in FIG. 24, there is a cavity 153 in the bottom of the door 135 and which receives the blender assembly 150. The blender assembly includes the blender hopper 150S which has a top flange 150F. (FIGS. 28, 28A, 28B, 28C, 30) having an outer edge which is shaped to fit the outside wall 153W of cavity 153. The blender hopper flange 150F is supported in place in the cavity 153 by a U-shaped clamp 154 (FIG. 29). The arms 154L, 154M and 154R of the clamp are received in holes 155L, 155M and 155R (FIGS. 24, 31) formed in the door material at the sides of the cavity 153 as best shown in FIGS. 28 and 33 and in phantom in FIG. 34. FIG. 29 shows the clamp viewed from the top. The clamp short arm 154M projects into cavity 153 under the hopper flange 150F at the front of the blender hopper and supports the blender hopper at the front. The side arms 154L and 154R are supported throughout their length in the holes 155L and 155R, respectively. Holes 155L and 155R intercept the cavity wall 153W as shown by the phantom lines 155L and 155R in FIG. 34. At these locations, the clamp arms 154L and 154R intercept the cavity under the blender hopper flange 150F and support the flange at the extension tab portions of the hopper flange 150F at the sides of the hopper. The clamp 154 has a bridge 154B fixed to the proximal ends of the arms and extending downward (FIG. 30). The bridge serves as a handle to push the clamp into place securing the blender hopper, or to pull the clamp out to release the blender hopper.

Referring further to FIGS. 24, 25, and 27, the carousel base 132A is a hollow column and is part of the top extension 132E. The upper edge is circular and receives and supports the top flange 161T of the upper funnel 161. The lower end of funnel 161 is received in loose fit in funnel adapter 162 which, in turn, is received in a transfer tube 163, the lower end of which is received in a receiver portion 164 of the door at the upper end of the hole 135A in the door 135. The lower end of hole 135A communicates with a kidney-shaped opening 135F (FIG. 34) at the door bottom cavity 153 and which is sized and shaped to discharge into the blender hopper, the solid particulate condiments when flowing down the hole 135A. The loose fit of the funnel into the adapter is to enable the adapter to slide upward on funnel 161 when lifting the transfer tube 163 from the opening in the top of door 135 whenever the door is to be removed for cleaning the freezer barrel. The carousel assembly 166, like that shown in FIG. 2A, is received on the top of and supported by the funnel flange 161T in the same manner as in FIG. 2A. While the carousel is not shown in detail in FIGS. 24, 25 or 27, it is basically the same as and supplied by control and power signals as previously described above for the other embodiments. While the condiment containers may be removable for refilling as described above, they may also be provided with caps at the upper ends thereof for opening and refilling.

Referring again to FIGS. 28, 30 and 33, the door material has a radially inward step 138S in the hole 138 at the top of cavity 153, where the door material projects downward into the blender assembly 150, providing a tubular stem 135S (FIGS. 27, 28, 30, 33) which serves as the axle for an auger 152.

The auger has a core 152C mounted for rotation on the stem 135S. The auger core 152C extends downward to a level immediately above the lower end of stem 135S. The rest of the two flights 152A and 152B of the auger 152 from the bottom of the stem 135S down to their tips have serrations 152S on their inboard edges.

Referring back to FIGS. 28 and 34, the hole 135A, which serves to pass the solid condiment ingredients down through the door, has its outside wall converging at 135C toward the rotational axis of the auger. As mentioned above, the hole exit is at opening 135F (FIG. 34) in the top 153T of door cavity 153 to direct the solid ingredients down into the upper end of the blender hopper, thereby into the upper end entrance of the auger.

Now, referring again to FIGS. 28, 35A and 35B, references 152U refer to the upper edge (which is the leading edge) of each of the auger flights, and is spaced below the top 151T of the toothed portion of a gear ring portion 151 of the auger. This is to allow the condiment solids such as candies, for example, to fall under the upper portions of the auger flights 152A and 152B without getting "batted" up toward the opening 135F. The spacing is also intended to inhibit lodging of hard candies between the auger and the opening 135F.

The gear ring portion 151 is circular and is centered on the auger core axis 152P, and has teeth on its outer marginal portion. There is a cylindrical support ring portion 151S of the auger located under the gear ring portion. The support ring portion is provided to help in keeping an accurate circular shape to the gear. The outboard end portions of the leading edges of both of the auger flights are joined to this support ring as at 152E in FIGS. 28 and 35A-35E. A side view of a fillet at the junction 152E for flight 152A is shown best in FIG. 35D. In FIG. 35D, reference 35L represents schematically, the outboard edge of flight 152A. The junction for flight 152B with the support ring is identical to that for flight 152A, but 180 degrees away around the support ring. Preferably the gear ring, the support ring, the auger flights and the core support portions of the auger will be one molded plastic unit to give structural continuity to the part. The two junctions 152E of the gear support ring to the auger flights, one junction per flight, support the flights. The inboard (closer to the axis) portions of the two flights are joined to and support the core portion 152C of the auger from the upper edges 152U of the flights down to the bottom end of the core portion.

Figure 35A:
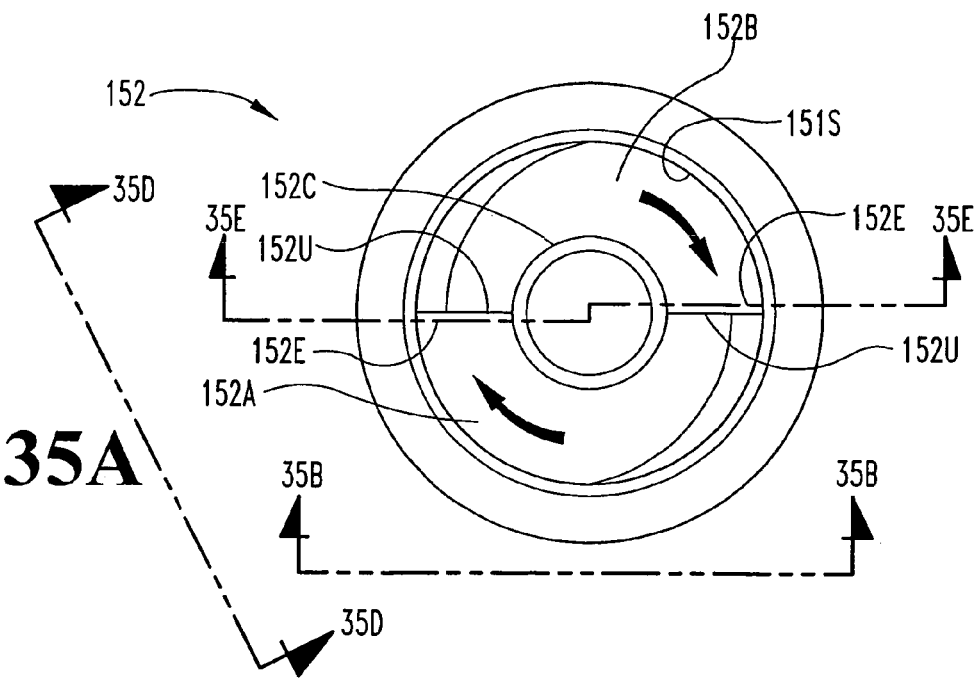
FIG. 35A is a top view of the auger.
Figure 35B:
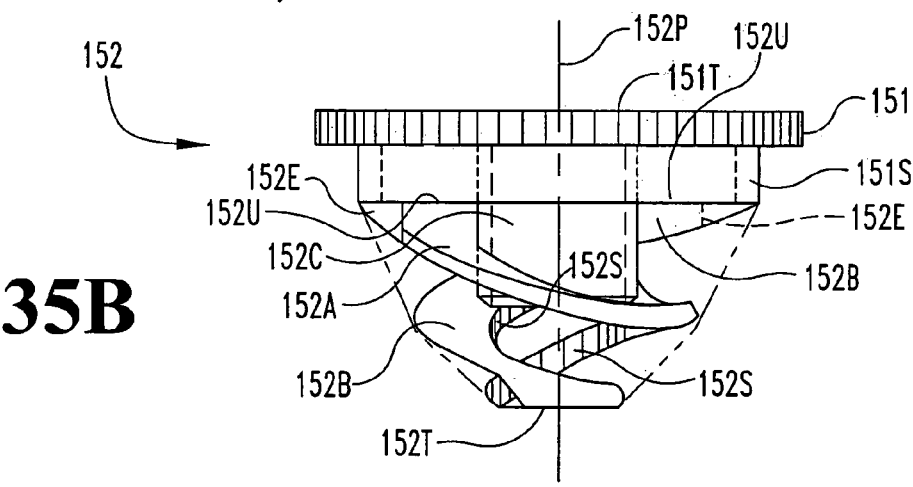
FIG. 35B is a side view of the auger taken at line 35B-35B in FIG. 35A and viewed in the direction of the arrows with a portion broken away to show interior detail.
Figure 35C:
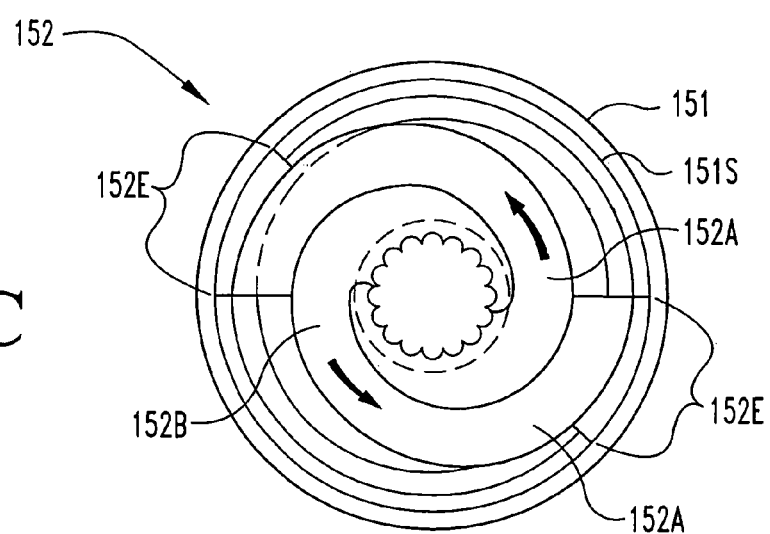
FIG. 35C is a bottom view of the auger.
Figure 35D:
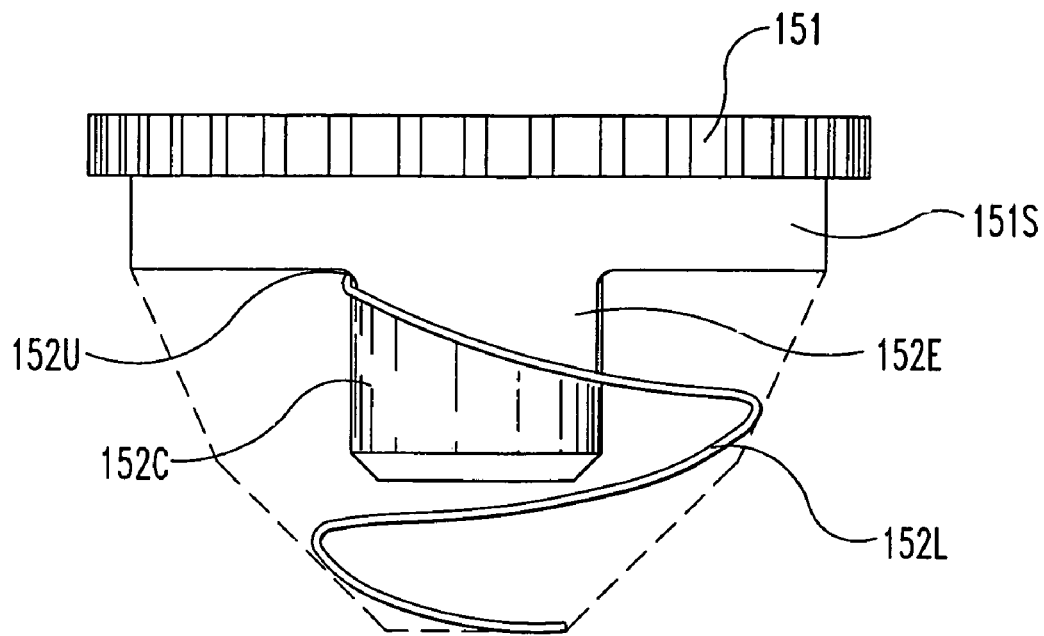
FIG. 35D is a side view of the auger taken at line 35D-35D in FIG. 35A, viewed in the direction of the arrows, with schematic showing only one auger flight.
Figure 35E:
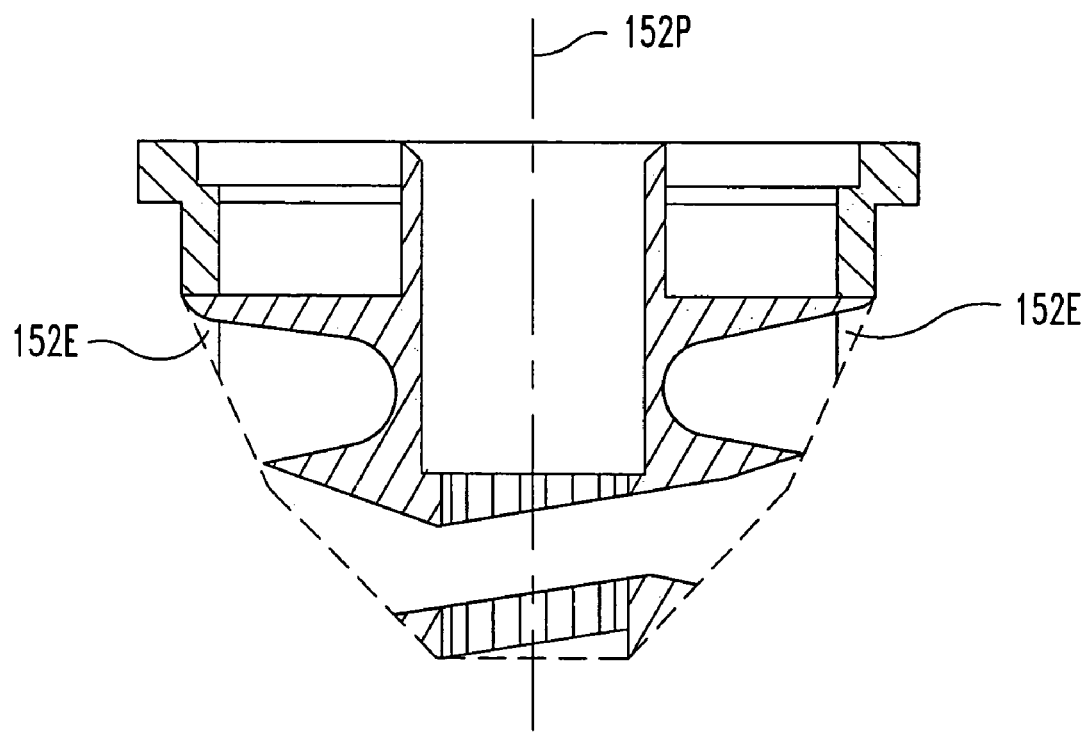
FIG. 35E is a section taken at line 35E-35E in FIG. 35A and viewed in the direction of the arrows.

Referring to FIGS. 28, 28A, 28B and 28C, along with FIGS. 35A, 35B and 35C, it can be noted that the blender hopper and the auger, have similar profiles. The top flange of the blender hopper provides axial support for a drive pinion 149, and for the auger gear 151. The upper portion of the blender hopper which is immediately under the flange and which is cylindrical, is close to the support ring portion of the auger and inhibits communication of fluids or solids upward from the blending chamber toward the gears. There are upper intermediate portion 150B and lower intermediate portion 150C of the blender hopper. These portions converge at 25° and 45°, respectively, relative to axis 152P toward the cylindrical lower end portion 150D of the blender hopper surrounding the outlet 150E. Other convergent relationships may be useful but this one provides ample room for passage of solids down and around the auger core followed by propulsion radially inward between the lower end 138E of the frozen base passageway stem 135S and the outlet 150E of the blender hopper. The outboard edge of each of the flights, having the same profile as the wall of the blender hopper, sweeps close to the inside wall of the blender hopper at all levels as the auger rotates.

As mentioned above, some components are housed in the cantilever overhang 132E. As shown at the cutaway area in FIG. 27, there is a solenoid 134 which is operable to open and close the base mix dispensing valve 136. Although normally closed, this valve is shown in the retracted position where it is open to admit soft-frozen base mix from the freezer through the aperture 137 (FIGS. 27, 28 and 30) into passageway 138 in the freezer door 135. The solenoid plunger 141 is pinned at 142 to the yoke in the upper end of the valve plunger 143.

An auger drive motor 146 has an output shaft coupled by connector 147 to the upper end of a drive shaft 148, the lower end of which mounts the pinion gear 149, engaging gear 151 to drive the auger in rotation in the direction of arrows 152S in FIG. 35A. A data entry panel 167, to be described below, is on the front of the overhang. Power supplies, electrical and electronic controls and processors are located in this overhang directly behind the data entry panel. The power supply is positioned to receive 115/210 AC power from the freezer electronics.

Figure 31:
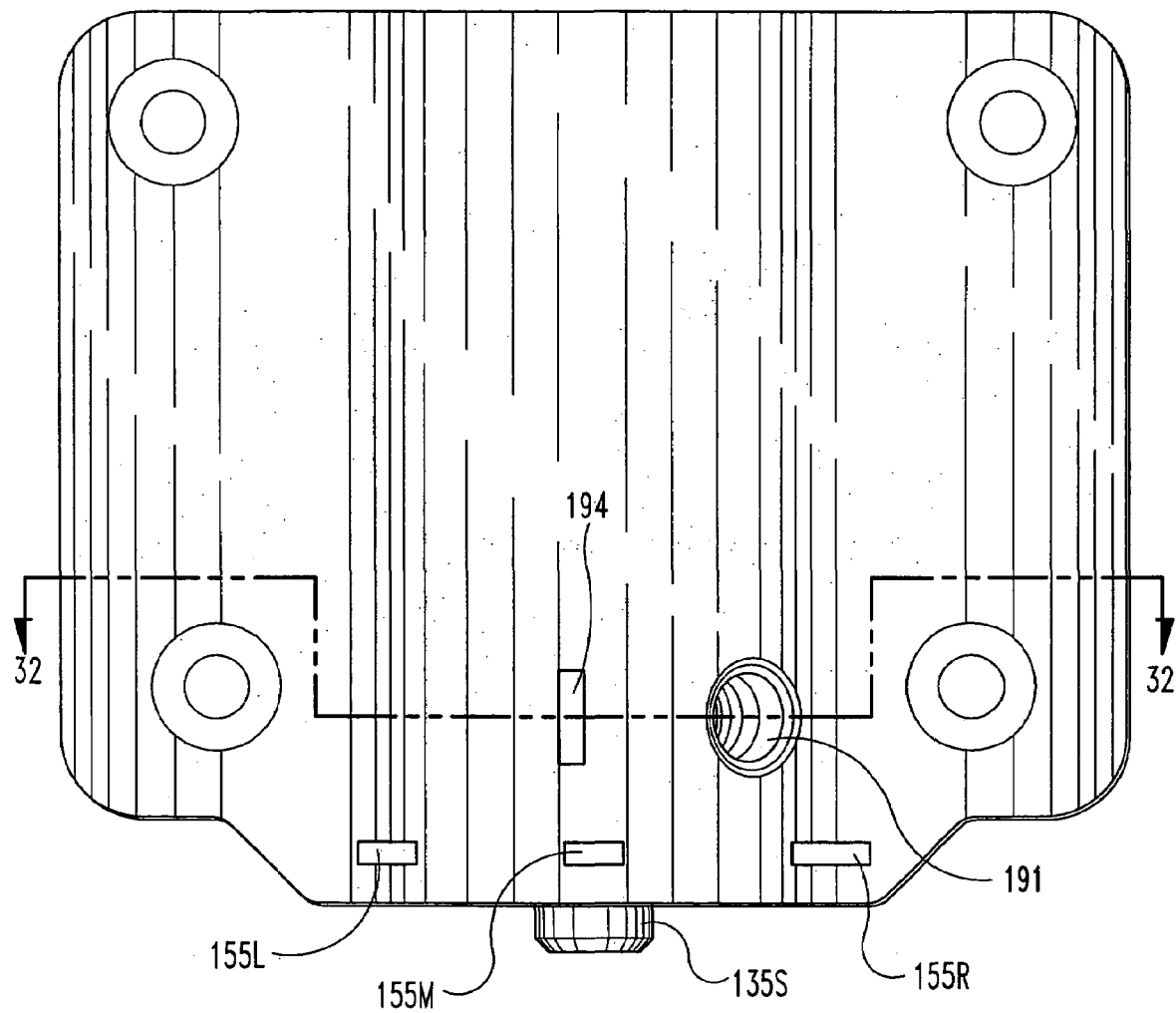
FIG. 31 is a front elevation view of the freezer door separate from the freezer.

Referring now to FIGS. 31-33, a port 191 is provided on the front of the door for reception of the syrup injector plug 192. The injector receiver port 191 has two steps inward toward the port axis 190. These steps narrow the port to portions 191A, 191B and 191C. The injector plug has transverse posts 193 extending vertically at the end portion 192E. The door front has a hole 194 extending into the door for reception of a retainer clip 196 (FIGS. 32A and 32B) having a U-shaped yoke 197. The arms 197U and 197L of the clip are received around and engage the injector above and below the end portion 192E of the injector and engage the posts 193 above and below the end portion 192E of the injector, thus retaining the plug in the port 191. A circular seal 198 seals the end of the injector plug to the face of the inner end of the port portion 191B. The hole 191C in that face of the injection port 191 communicates with the interior of hole 138 in the door below the base mix entry opening 137, for injection of any one or more of the flavors available from the syrup injection system. An example of such system includes, for the plug 192 in FIG. 33, the manifold 34 and associated flavoring syrup storage and delivery module 12 of my above-mentioned U.S. Pat. No. 6,689,410 B2, issued Feb. 10, 2004, the "'410 patent". The content of the '410 patent is incorporated herein in its entirety by reference. In a manner similar to that described above for the hopper retainer clamp 154, the retainer clip 196 has a tab 196T to facilitate insertion and withdrawal of the clip.

When a dispensing function is commenced, the valve 143 is opened to the position shown in FIGS. 27,28 and 30, and the semi-frozen base mix flows out the hole 137 into hole 138 and down through the stem 135S. The syrup is injected from hole 191C into the flowing base mix immediately below the port 137. Condiments start to flow down from the carousel 166 and through the door passageway 135A. The auger starts rotating and the condiments fall into it and are blended into the base mix along with the syrup. The above-mentioned serrations 152S on the inboard edges of the auger flights below the auger axis stem 135S are provided to facilitate mixing the syrup into the frozen base mix.

Figure 36:
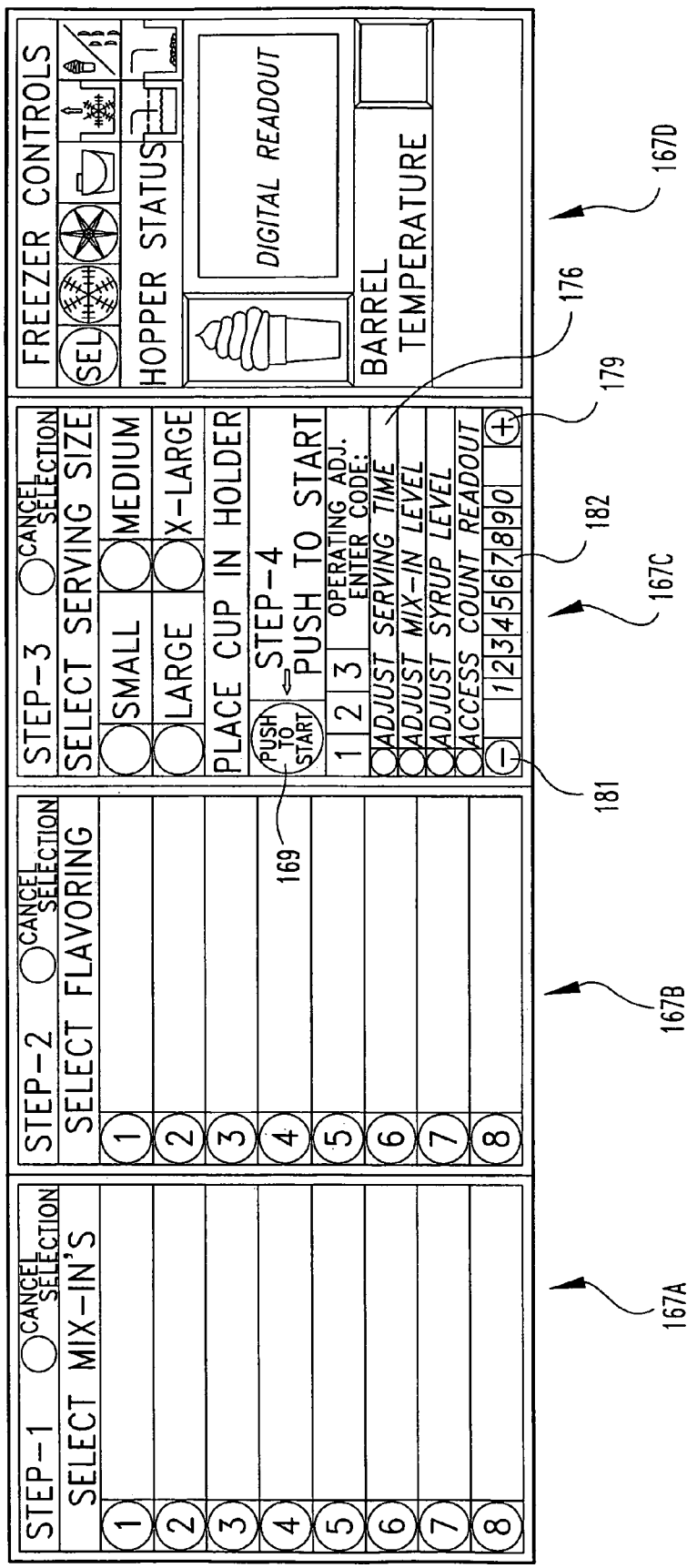
FIG. 36 is an elevation view of the data entry panel.

Referring again to FIGS. 24 and 27 but particularly to FIG. 36, there is a data entry panel (DEP) 167 on the front of the extension 132E. As shown, this panel includes three serving control areas, and one freezer control area. Serving control area 167A includes a "STEP-1" legend and eight lines enumerated 1 through 8. Each of these lines may have labeling on it such as, for example, the words "M&M's", "Oreos", "Heath Toffee", "Butterfinger", "Reese's Mini's", "Nerds", M&M Chips", "Cookies & Cream". Of course, this labeling refers to brand names of different condiment solids contained in different ones of the eight containers mounted in the carousel 166.

Similarly, area 167B includes a "STEP-2" legend and eight lines 1 through 8. Each of these may have syrup flavor labeling such as "CHOCOLATE", "RASPBERRY", "STRAWBERRY", etc.

In area 167C, the top line legend is "STEP-3" offering four serving sizes and advising to "PLACE CUP IN HOLDER." Below that is a legend "STEP-4" and the legend "PUSH TO START" with the key 169. The foregoing areas 167A, 167B and portion of area 167C are for use by the customer. The rest of area 167C is for use only by the manager or owner of the machine.

In the manager's portion of area 167C, there are access code entry keys and an operating adjustment legend. Under these there are keys with associated legends "ADJUST SERVING TIME", "ADJUST MIX-IN LEVEL", "ADJUST SYRUP LEVEL", and "ACCESS COUNT READOUT", respectively. The line below those includes a "+" key 179, a "−" key 181, and a bar graph or enumerated windows 182. These keys are managed by the person in charge of the freezer, who would have an access key or code to enable operating the keys.

The "serving time" would be established, based upon the characteristics of the freezer rate of discharge of frozen base mix. The "MIX-IN-LEVEL" selection would be based on the rate of release of the condiment solids from the carousel and the percentage of solids to be included in a serving. The syrup level would be based on how much is to be injected for a serving. The access count registers how many servings have been drawn from the freezer. The "+" and "−" keys are usable along with each of the other adjustment keys to increase or decrease the values selected. The light-emitting diodes (LED) bar graph and/or numerals display is useful during each adjustment to observe how much and how fast a change is being made. The area 167D of panel 167 is for management of the freezing functions and not for customer use.

Operation of the FIGS. 24-36 Embodiments

The dispensing freezer according to this embodiment of the present invention, is intended for the customer to easily operate the system for obtaining a soft-serve confection serving of the size desired and including the desired condiments and flavoring blended into the base mix serving. The operating sequence is as follows:

1. When the condiment solids (candies or chips or other types) and the syrups (flavors or colored or both) are loaded into the system carousel, corresponding labels are inserted in the respective slots on the data entry panel (DEP) 167.

2. The customer is led through the operating procedure by a progression of light emitting diodes (LED's) with the blinking light showing first behind the "SELECT" "STEP-1".

3. As the customer makes his/her first selection under "STEP-1", an LED starts blinking behind the "SELECT FLAVORING" in the "STEP-2" of area 167B.

4. The customer selects the choice of flavoring(s) in the "STEP-2" area 167B. At the same time, the LED in the "STEP-3" section begins blinking to lead the customer to "STEP-3".

5. The customer selects the size of serving desired, small, medium, large, or extra large. As soon as that selection is made, an LED begins blinking in the "PLACE CUP IN HOLDER" area.

In any of the three areas 167A, or 167B, or 167C, if the customer inadvertently chooses the wrong selection or has a change of mind, cancellation of that choice can be made in the respective section using the "CANCEL SELECTION" key in the relevant area. A new selection can then be made in that area or, if desired, a selection in area 167A or 167B can be omitted, in which case the soft-serve product to be dispensed into the cup would be of whatever flavor, if any, may exist in the frozen base mix.

After the cup is placed in the holder 130H, the blinking light moves to "STEP-4", "PUSH TO START". The customer pushes the "START" key to start the freezer dispensing into the cup. The freezer automatically ceases dispensing after the designated time cycle has expired based upon the size of the serving. This completes the drawing of the product. All customer selection areas are automatically reset for use by the next customer.

As indicated above, the customer does not have access to other functions shown on the DEP. "OPERATING ADJUSTMENTS" are only accessible to the owner or manager, as those functions must be "unlocked" by the manager using the predetermined code or combination of the 1, 2, and 3 numbered keys. When the correct code is entered, the manager can adjust any of the items shown on the DEP as follows:

ADJUST SERVING TIME: When the manager wants to establish how much time should be allocated to each respective size of serving to be drawn, the manager presses the key to access that function and then adjusts the time by using the bar graph (−) or (+) keys to decrease or increase the time. He can then exit that function by selecting another function to be adjusted or press the "CANCEL SELECTION" key at the top of "STEP-3" section.

ADJUST MIX-IN LEVEL, ADJUST SYRUP LEVEL: The same procedure is followed to increase or decrease the volume or portion of condiment mix-in's or flavoring that the manager wishes to have in the blended product dispensed.

ACCESS COUNT READOUT: A microprocessor in the controller keeps a record of the total number of servings that have been drawn from the freezer at any time. This information can be accessed in the same manner as the other functions above.

As will be seen from the foregoing, the system is very user friendly. The customer only needs to perform four functions, and is led through the procedure by a progression of blinking lights. If the customer desires to make multiple selections in either of the areas 167A or 167B, the customer can do so.

As a matter of example, without limitation, some values will be mentioned here. An example of a "small" serving size selection may dispense for 5 seconds; medium for 7 seconds; large for 9 seconds. Pressing the "START" key initiates the start of dispensing of the ice cream and condiments. When the "START" key is pushed, the assigned time starts with the condiment dispensing motor such as 160 (FIG. 27) activated and causing the impeller 160A to rotate, transferring the condiment solids from the storing container to the opening at the top of the hopper 161. Condiments begin to proceed downward from hopper 161 through funnel 162 into the transfer tube 163 and through passageway 135A in the freezer door 135 toward the auger in the blender assembly 150.

One second after the "START" key is pressed, the solenoid 134 is activated, pulling the valve plunger 143 upward to the valve-open position shown in FIGS. 27 and 28, opening the port 137, allowing ice cream soft-frozen base mix to flow through the port 137 into the passageway and downward into the blending hopper 150S.

One and one-half (1.5) seconds after the "start" key 169 is pressed, the auger drive motor 146 begins to rotate, causing the auger 152 to rotate. Also, the flavor injection begins. As the auger rotates, ice cream flows through the center of the auger and into the opening at the bottom of the blending hopper. As the ice cream flows through the center of the rotating auger, the condiments are forced into the ice cream by the rotating of the auger, and the flavoring is introduced into the ice cream by the rotating of the auger. The combined product, the ice cream and the condiments and syrup, flows from the blending hopper outlet opening 150E outward and downward into the cup 130. If desired, a decorative star (FIG. 15 for example) or other product shaping insert 150T (FIG. 28) may be provided in the outlet opening 150E.

Two seconds before the assigned time expires for the serving size selection of "STEP-3" listed above, the condiment dispensing motor stops rotating, stopping the flow of the condiments into the hopper funnel 161. At the same time, the injection of flavoring syrup stops. Stopping the condiment and flavoring syrup flow early, prevents the residual "carry-over" of condiment products and flavoring syrup in the blending hopper from one serving to the next. Transfer time for the condiments entering the hopper funnel and progressing through the blending hopper is approximately 1.5 seconds.

When the assigned time expires, the solenoid 134 closes the plunger 43 over the hole 137, stopping the flow of ice cream through the blending hopper 150S.

The blending motor 146 continues to rotate for three seconds after the solenoid 134 closes, to assure that all products are purged from the blending hopper 150S.

The filled cup 130 can then be removed from the cup holder.

If more than one condiment (or flavoring syrup) is selected, the duration of the operation of the motors 160 (or injection pumps) will depend upon the total serving time available as dictated by previous machine set-up operation of the serving time adjustment key 176 made by the manager. As mentioned above, for this adjustment, the plus and minus keys 179 and 181, are available to make the adjustment once the key 176 is selected. Also as mentioned above, the adjustment can be visualized by the bar graph 182 which may be provided by light emitting diodes behind each of the windows on the scale. When multiple condiments are selected, the motors 160 will run in sequence in the order selected, each sharing time equally with the others in repeated sequencing within the available serving time. As an example, the time value may be adjusted from 0.2 seconds to 2.0 seconds in graduating increments of 0.2 seconds.

The foregoing procedure can be implemented by unsophisticated combinations of electronic, pneumatic, optical, and mechanical devices well within the skill of the art, which need not be described here. Similarly, materials suitable for the various components are known and used in the food service equipment art. It is preferred that the pinion gear be made of molded plastic, and that the ring gear and associated auger be one piece molded plastic. A Delrin® brand material is suitable for this purpose. It is also preferred that the door 135 be a one-piece molded part, with little or no machining. An ABS material is suitable for this purpose.

If, at some time in the future, there arises a market for a customer selection of different proportions of selected condiments and flavors, that can be done by a software change.

The rotational speed of the auger in the freezer cylinder may be approximately 100 revolutions per minute (RPM), or whatever other speed will produce the desired soft-serve type frozen base mix. The rotational speed for the auger in the blender hopper may range from approximately 1000 RPM under no-load conditions to approximately 750 RPM during dispensing of base mix and condiments.

As an example, where the auger core portion has an internal diameter of 0.760 inches received for rotation on the auger bearing stem 135S of the door, the diameter across the points of the serrations 152S may be 0.625 inches. As a further example, the nominal outside diameter of the core portion may be 0.875 inches. Also, as an example, the circumferential distance from the outboard portion of the leading edge of a flight to the trailing edge of the fillet 152E may be 0.875 inches.

While the invention has been illustrated and described in the drawings and foregoing description, the same is to be considered as illustrative and not restrictive in character, it

What is claimed is:

1. Apparatus for dispensing a chilled viscous confection comprising a blend of frozen edible base product and edible ingredient solids, the apparatus comprising:
   a freezer producing a frozen edible base product and having a freezer outlet for dispensing the frozen edible base product;
   a blender having an adapter coupled to said freezer outlet for receiving the frozen base product from said freezer, and said blender having a blended product outlet;
   said blender having a first passageway from said adapter toward said blended product outlet for movement of said frozen base product from said freezer outlet toward said blended product outlet;
   a plurality of containers for different ingredient solids;
   a plurality of valves, said valves being associated with different ones of said containers for controlling delivery of solids from said containers;
   a second passageway associated with said valves to receive solids delivered from said containers and enable movement of said delivered solids toward said blended product outlet;
   a conveyor auger having a portion in said second passageway for blending solids with said frozen base product during movement of said base product toward said blended product outlet;
   an auger drive motor coupled to said auger for driving said auger; and
   a controller coupled to said valves and having a selector for selecting and enabling selected ones of said valves to operate in sequence during movement of frozen base product from said freezer outlet toward said blended product outlet for producing a blend of selected ones of said ingredient solids in said frozen base product.

2. The apparatus of claim 1 and wherein:
   said first passageway includes a tubular portion providing a rotational axis for said auger to be driven in rotation on said axis.

3. The apparatus of claim 2 and wherein:
   said tubular portion of said first passageway has an end remote from said adapter, and spaced from said blended product outlet;
   said blender includes a portion of said second passageway surrounding said auger;
   said auger-surrounding portion has a wall which has an inside surface which is circular around said axis;
   said inside surface has a profile which includes a cylindrical portion and a converging portion, and the converging portion extends downward from said cylindrical portion and inward toward said axis; and
   said auger has a core centered on said axis and which has at least one helical flight which projects radially outward from said core and which is shaped to fit said inside wall surface of said auger-surrounding portion of the blender, to sweep said delivered solids down said inside wall surface toward said blended product outlet as said auger is rotated on said axis; and
   said core has at least one hole for passage of said frozen edible base product from said first passageway through said hole into said second passageway.

4. The apparatus of claim 3 and wherein:
   said tubular portion has a wall with holes in said tubular portion wall for passage of said frozen base product radially outward from said first passageway toward said cylindrical portion of said inside wall surface for blending said delivered solids into said frozen base product as said delivered solids and frozen base product are moved toward said blended product outlet by said auger.

5. The apparatus of claim 3 and wherein:
   said remote end of said tubular portion is constructed to divert passage of said frozen edible base product in said first passageway away from said end and out through said holes in said tubular portion and said core into said second passageway.

6. The apparatus of claim 2 and wherein: said tubular portion has a wall with at least one hole in said tubular portion wall; said auger has a hollow core, with said tubular portion extending axially in said core;
   a portion of said core has at least one hole at a location enabling registry of said hole in said core with said hole in said tubular portion as said auger rotates to enable passage of said frozen base product from said first passageway through said registering holes into said second passageway for blending.

7. The apparatus of claim 2 and wherein:
   said auger has a hollow core, with said tubular portion extending axially in said core;
   a portion of said second passageway fittingly receives said auger whereby said auger is able to move selected ones of said ingredient solids toward said blended product outlet;
   at least one portion of said auger core has a cut-out near said remote end of said tubular portion;
   said cut-out is closer to said blended product outlet than is said remote end of said tubular portion, for enabling said selected ones of said ingredient solids when moved down said inside wall by rotation of said auger to move inward toward said axis of rotation and through said cut-out and blend into said frozen base product passing from said tubular portion toward said blended product outlet.

8. The apparatus of claim 7 and wherein:
   said tubular portion of said first passageway has an end remote from said adapter, and spaced from said blended product outlet;
   said blender includes a portion of said, second passageway surrounding said auger;
   said auger-surrounding portion has a wall which has an inside surface which is circular around said axis;
   said second passageway includes a blending chamber in space encompassed by said converging portion.

9. The apparatus of claim 1 and further comprising; a source of flavoring liquids coupled to said first passageway,
   said source having a plurality of liquid containers separately containing different flavoring liquids;
   a second controller coupled to said liquid containers for selection of different liquids for introduction to said first passageway for blending into said frozen base product.

10. The combination comprising:
    a soft-frozen confection freezer having a cabinet with a top, and having a soft-frozen confection base holder in the cabinet, the holder having an outlet opening;
    a door on the cabinet, the door having a cabinet-facing surface;
    a storage apparatus on said freezer at a level above said outlet opening and holding a plurality of ingredient containers for containing solid edible ingredients to be blended with said soft-frozen confection base;

a rotary power source above said door;
a rotary power transmission device which extends from said power source downward through said door and out through a bottom surface of said door;
a plurality of passageways in said door,
a first of said passageways located for transfer of selected ones of said ingredients from said containers downward through said door,
a second of said passageways having an inlet through said cabinet-facing surface of said door and communicating with said holder outlet opening to receive soft-frozen confection base from said holder;
a third of said passageways having an inlet inside said door communicating with said second passageway for transfer of said soft-frozen confection base from said second passageway downward through said third passageway to an outlet of said door;
a fourth of said passageways extending through said door and housing a portion of said power transmission device; and
an auger mounted to said door for reception of said selected ones of said ingredients from said first passageway and for reception of said soft-frozen confection base from said third passageway and coupled to said power transmission device for rotation of said auger centered on an auger axis to blend said selected ones of said ingredients received from said first passageway into said soft-frozen confection base received from said third passageway.

11. The combination of claim 10 and wherein:
said holder is a freezer barrel with said outlet opening at an end of the barrel.

12. The combination of claim 11 and wherein:
said cabinet-facing surface of said door is sealed to said cabinet and closes said end of said barrel.

13. The combination of claim 10 and further comprising:
a valve in said third passageway and normally preventing entry of said soft-frozen confection base from said second passageway into said third passageway; and
a valve actuator coupled to said valve and operable, when actuated, to open said valve and admit said soft-frozen confection base into said third passageway to move downward into said auger.

14. The combination of claim 13 and wherein:
said cabinet has a front wall;
said cabinet has an extension portion which extends forward from said front wall of the cabinet, and the extension portion has a top;
said storage apparatus is mounted on the top of said extension portion;
said rotary power source is an auger drive motor mounted at a level below the top of said extension portion; and
said valve actuator is mounted at a level below the top of said extension portion and is operable, when actuated, to open said valve and admit said frozen confection base into said third passageway to move downward into said auger.

15. The combination of claim 13 and wherein:
said valve actuator is a solenoid;
said rotary power source is an auger drive motor;
said power transmission device is a shaft;
a first gear is connected to said shaft; and
said combination further comprises:
a second gear which is coupled to said auger and cooperates with said first gear for transmission of power from said first gear to said second gear.

16. The combination of claim 15 and wherein:
said second gear engages said first gear;
said auger has a gear support ring portion and a core portion, with both said support ring portion and said core portion centered on said core axis;
said auger has at least two spiral flights, each flight having a leading edge portion joined to said support ring portion and supported by said support ring portion, each of said flights extending downward from said support ring portion in a spiral centered on said auger axis; and
said core portion is joined to inboard portions of said flights and is mounted to said door for rotation on said auger axis.

17. The combination of claim 16 and wherein:
said auger core portion is tubular and has a longitudinal axis.

18. The combination of claim 17 and wherein:
said door has an internal tubular stem having a longitudinal axis;
said auger core portion is mounted on said stem with said axis of said core portion co-linear with said axis of said stem for rotation of said core portion on said stem axis; and said auger has at least one of said flights beginning at said core portion and said ring portion at a level below said second gear and extending in the direction of said auger axis in a spiral whereby said selected ones of said ingredients are enabled to pass into said auger.

19. The combination of claim 18 and wherein:
said auger has a second flight beginning at said hub portion and said ring portion at a level below said second gear and extending in the direction of said auger axis in a spiral whereby said ingredients are enabled to pass into said auger.

20. The combination of claim 13 and wherein:
said rotary power source is an auger drive motor;
a first gear is coupled to said power transmission device; and
a second gear is coupled to said auger and cooperates with said first gear for transmission of power from said first gear to said second gear.

21. The combination of claim 20 and wherein:
said auger has a core portion which is tubular and has a longitudinal axis;
said door has an internal tubular stem having a longitudinal axis;
said core portion is mounted on said stem, with said axis of said core portion co-linear with said axis of said stem for rotation of said auger on said stem; and
said auger has at least one flight beginning with a leading edge and extending from said leading edge downward in the direction of said auger axis in a spiral centered on said auger axis, said leading edge having an outboard portion adjacent said second gear and having an inboard portion adjacent said core portion.

22. The combination of claim 21 and wherein:
said door including said stem is one homogeneous body of plastic material.

23. The combination of claim 21 and wherein:
said auger flight extends from said leading edge downward to a distal end remote from said core portion.

24. The combination of claim 23 and wherein:
said stem has a distal end remote from said gear; and
said core portion has an end adjacent said distal end of said stem.

25. The combination of claim 24 and wherein:
said auger flight has serrations on said inboard portion between said distal end of said stem and said distal end of said flight.

26. The combination of claim 25 and wherein:
said auger has a second flight beginning with a leading edge and extending from said leading edge downward in the direction of said auger axis in a spiral centered on said auger axis, said leading edge having an outboard portion adjacent said second gear and having an inboard portion adjacent said core portion.

27. The combination of claim 26 and wherein:
said second flight extends from said leading edge thereof downward to a distal end remote from said core portion.

28. The combination of claim 27 and wherein:
said stem has a distal end remote from said gear; and
said core portion has an end adjacent said distal end of said stem.

29. The combination of claim 28 and wherein:
said second flight has serrations on said inboard portion thereof between said distal end of said stem and said distal end of said flight.

30. The combination of claim 26 and wherein:
said leading edges of said first flight and said second flight are approximately 180 degrees apart around said second auger axis.

31. The combination of claim 30 and wherein:
said gear and said core portion and said flights are one piece of plastic.

32. The combination of claim 21 and wherein:
said gear, flight and core portion are made of a single homogeneous material.

33. The combination of claim 32 and wherein:
said auger includes a gear support ring portion;
said auger includes a fillet joining said support ring portion at said outboard portion of said leading edge and extending about 0.875 inches circumferentially along said support ring to a trailing edge of said fillet, and said fillet extending downward along an outboard portion of said flight from said outboard portion of said leading edge.

34. The combination of claim 33 and wherein:
said core portion has an inside diameter of about 0.760 inches.

35. The combination of claim 21 and further comprising:
a blender hopper connected to said door and having a top portion adjacent said first passageway to receive said selected ones of said ingredients into said blender hopper;
said blender hopper having an outlet for dispensing a blended combination of said selected ones of said ingredients and said frozen confection base.

36. The combination of claim 35 and wherein:
said door including said stem is a unit of molded material;
said third passageway has a portion which extends longitudinally through said stem toward said blender hopper outlet.

37. The combination of claim 35 and wherein:
said third passageway is centered on said stem and on said blender hopper outlet.

38. The combination of claim 37 and further comprising:
a plurality of valves associated with said ingredient containers and having operating motors, operable when actuated, to open and release selected ingredients from said containers to. travel down said first passageway to said auger, and a control panel coupled to said valve actuator for operation of said valve actuator to open said valve in said third passageway to release said frozen confection base into said third passageway at a predetermined time following actuation of the first of said motors to release one of said selected ingredients into said first passageway.

39. The combination of claim 35 and wherein:
said blender hopper has a wall converging from a location near said top toward said blender outlet;
said flight has an outboard edge formed to move close to said converging wall to sweep said selected solid ingredients toward said auger axis;
said flight has a lower portion extending downward from a level of the lower end of said stem toward said blender outlet; and
said outlet of said third passageway is at said lower end of said stem.

40. The combination of claim 39 and further comprising:
a control panel coupled to said valve actuator and to said rotary power source and to said storage apparatus and operable by a user to select certain ones of said ingredients for blending with said soft-frozen base to produce a blend, and to select volume of said blend to be dispensed from said blender hopper outlet, and to cause dispensing of said blend into a user's receiver for consumption.

41. The combination of claim 39 and further comprising:
a liquid injector in said door and having liquid outlet means inside said door
a fifth passageway in said door and having an inlet communicating with said outlet means of said injector, and having an outlet communicating with said third passageway, for transfer of liquid when introduced from said outlet means of said injector, into said frozen confection base moving down said third passageway toward said outlet of said door.

42. The combination of claim 41 and further comprising:
liquid storage and delivery apparatus coupled to said injector for storage of flavoring liquids of different flavors for selective injection of different flavors from said outlet means of said injector into said frozen confection base moving down said third passageway.

43. The combination of claim 42 and wherein:
said lower portion of said flight has inboard edges with serrations in said inboard edges.

44. The combination of claim 43 and further comprising:
a control panel coupled to said valve actuator and to said rotary power source and to said storage apparatus holding ingredient containers and to said liquid storage and delivery apparatus and operable by a user to select certain ones of said ingredients for blending with said soft-frozen base, and to select certain ones of said flavoring liquids for blending with said soft-frozen base to produce a blend, and to select volume of said blend to be dispensed from said blender hopper outlet, and to cause dispensing of said blend into a user's receiver for consumption.

45. The combination of claim 44 and wherein:
said cabinet has a front wall; and
said cabinet top has an extension portion which extends forward from said front wall of said cabinet;
said extension portion has a front wall; and
said control panel is at said front wall of said extension portion.

* * * * *

UNITED STATES PATENT AND TRADEMARK OFFICE
CERTIFICATE OF CORRECTION

PATENT NO.      : 7,665,398 B2                                    Page 1 of 1
APPLICATION NO. : 11/354752
DATED           : February 23, 2010
INVENTOR(S)     : Ernest C. Gerber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Twenty-eighth Day of December, 2010

David J. Kappos
*Director of the United States Patent and Trademark Office*